(12) United States Patent
Filippone

(10) Patent No.: US 6,374,613 B1
(45) Date of Patent: Apr. 23, 2002

(54) MINIATURIZED WASTE HEAT ENGINE

(76) Inventor: Claudio Filippone, 8708 48th Pl., College Park, MD (US) 20740

( * ) Notice: Subject to any disclaimer, the term of this patent is extended or adjusted under 35 U.S.C. 154(b) by 0 days.

(21) Appl. No.: 09/582,233

(22) PCT Filed: Nov. 23, 1999

(86) PCT No.: PCT/US99/26018
§ 371 Date: Sep. 7, 2000
§ 102(e) Date: Sep. 7, 2000

(87) PCT Pub. No.: WO00/31400
PCT Pub. Date: Jun. 2, 2000

(30) Foreign Application Priority Data

Nov. 24, 1998 (IT) ................................ M19843

(51) Int. Cl.[7] ...................... F01K 23/10; F01K 23/14
(52) U.S. Cl. ........................ 60/608; 60/604; 60/618; 60/624
(58) Field of Search ................ 60/604, 608, 618, 60/624

(56) References Cited

U.S. PATENT DOCUMENTS

| | | | | |
|---|---|---|---|---|
| 2,109,237 A | * | 2/1938 | Lustig | .................. 60/618 |
| 2,360,969 A | * | 10/1944 | Newcombe | .................. 60/618 |
| 2,769,302 A | * | 11/1956 | Purdie et al. | .................. 60/618 |
| 4,366,674 A | * | 1/1983 | Eakman | .................. 60/618 |
| 4,996,845 A | * | 3/1991 | Kim | .................. 60/618 |

FOREIGN PATENT DOCUMENTS

| | | | | |
|---|---|---|---|---|
| DE | 657608 | * | 3/1938 | .................. 60/618 |
| GB | 283042 | * | 1/1928 | .................. 60/618 |
| GB | 751192 | * | 6/1956 | .................. 60/618 |

* cited by examiner

*Primary Examiner*—Michael Koczo

(57) ABSTRACT

A closed loop vapor cycle generated by a special device formed by heat transfer and a vapor expander means it is utilized to convert waste heat from conventional power systems into additional thermodynamic work, thereby improving the overall power system efficiency. Superheated vapor (i.e. steam) is instantaneously produced inside special energy transfer means where waste heat is converted into fluid energy with desired thermodynamic properties. The superheated vapor is then converted into mechanical energy through special work-producing units (expanders), thereby returning a significant fraction of the energy contained in the waste heat to the power system.

59 Claims, 20 Drawing Sheets

MINIATURIZED WASTE HEAT ENGINE

FIELD OF APPLICATIONS

The present invention is characterized by a combination of vapor-to-mechanical energy converters driven by rapid heat transfer means able to instantaneously transfer energy from the products of combustion, or any heat source, to a thermodynamic fluid circulating inside an independent loop. This fluid moves inside the loop mainly as a result of its own expansion and transfers its energy to mechanical means through thermodynamic work-producing units or expanders. In this manner, the various components of this device constitute a special Miniaturized Waste Heat Engine (MWHE) able to recuperate and convert waste energy from combustion or heat sources into useful energy. By returning a significant fraction of this recuperated energy to the power system (for example in the form of mechanical or electrical energy), the usually unavoidable heat discharge into the environment is minimized, while pollutant emission can be significantly reduced at no energy cost for the power system.

To simplify the description of the working principles and methods of operation of this invention, an internal combustion engine (fueled with heavy or non-heavy fuels) is from now on considered to be the power system. However, any power system utilizing heat sources and producing waste heat as a result of their operation could utilize the techniques and methods described by this invention.

When this invention is applied to an internal combustion engine, the energy of the exhaust combustion gases (high temperature and mass flow rate) is converted into additional horsepower transferred directly to the engine load, via the engine crankshaft, and/or indirectly via special engine intake oxygen enhancing means.

The MWHE contains one or more vapor-to-mechanical energy converting systems, referred to hereafter as expanders; one or more instantaneous heat transfer systems, referred to hereafter as converters; one or more instantaneous vapor collapsing systems, referred to hereafter as imploders; and one or more air/oxygen enhancing systems, referred to hereafter as oxygenators.

In general the MWHE is formed by one or more converters coupled with a series of expanders including a vapor condensing system, or imploder, so as to form a thermodynamic cycle A converter (or multiple converters) returns the recuperated energy from the exhaust gases through one or more expanders in the form of mechanical energy, adding it to the power normally generated by the engine. Another converter (or the excess recuperated energy of a single converter) allows the pressurization of the engine intake manifold through the oxygenator, thereby providing excess oxygen to the air fuel mixture independently of the engine rotational speed, or revolutions per minute (RpM). By utilizing this particular oxygen enhancing feature, the engine performance can be significantly improved since air/oxygen is virtually pumped into the engine at all times, regardless of the RpM, at no cost. If this device is applied to a diesel fuel engine, the production of highly toxic particulate is almost eliminated since excess oxygen is always present during combustion, even when the engine is accelerating from idling speeds.

Therefore, the main application of this thermodynamic engine can be seen as an anti-pollution system, especially when applied to heavy fueled engines but also as a device able to significantly improve engine performance while reducing fuel consumption. Again, it is important to emphasize that the source of energy of this invention is constituted by heat that is normally irreversibly discharged into the environment.

PRIOR ART

Engine intake air-enhancement-systems are normally characterized by centrifugal turbo-compressors, or turbochargers, and by positive displacement air compressors. The centrifugal compressors are devices utilized to provide excess air to the engine allowing increased power output and generally improving the combustion. These devices improve the overall engine efficiency because they recuperate a fraction of the kinetic energy and pressure energy contained in the exhaust gases produced during combustion. Centrifugal compressors are widely used in Internal Combustion (IC) engine applications since they show reasonably good efficiencies when they operate at the proper speeds, are reasonably rugged, and last for the entire life of the engine. Air compressors for IC engines are generally formed by two counter-opposed sections containing the Exhaust Gas Wheel, "EGW," and the Compressor Wheel, "CW," connected by a common shaft. The EGW converts parts of the kinetic and pressure energy of the exhaust gas into shaft power. Since the CW is also mechanically connected to the same shaft, it converts the shaft power provided by the EGW into air pressure at the discharge of the CW. In this manner, the engine intake manifolds become pressurized and more air/oxygen is available to the engine. Thanks to these devices, it is possible to increase the amount of fuel injected in the combustion chamber and increase the overall engine power output. Unfortunately, the efficiency of the centrifugal compressors is optimized only for a significantly high range of rotational speed of the CW (generally greater than 30,000 RpM). Such speeds are only reached when the mass of exhaust gases (mass flow rate, grams-per-second), matches the optimized EGW RpM, so that the maximum torque is transferred through the shaft to the CW. This unavoidable sequence of events creates the conditions for a delay, called "turbo-lag," imposed mainly by the fluid-mechanical inertia of the exhaust gases, the mechanical inertia of the EGW, CW, and many other factors. Due to the fact that the exhaust gases are a consequence of the combustion process, the engine experiences a significant delay between the time the fuel is injected and the time the proper quantity of oxygen in the combustion chamber is made available by the compressor. This delay provokes a severe drop in engine performance during acceleration, particularly from idling to higher RpM. In fact, during these phases there is not enough oxygen to complete combustion, therefore the production of pollutant emissions is significant while the engine performance is impaired. This condition exists for several seconds every time the engine accelerates and it becomes even more pronounced when the engine is severely loaded.

Normally, if the engine is idling and the accelerator pedal is suddenly pressed the fuel appears inside the combustion chambers almost instantaneously, but the availability of oxygen is completely insufficient to complete combustion. Eventually, the engine RpM changes from idling to the desired speed and an increasing mass flow of exhaust gases starts to provide enough torque to the centrifugal compressor, thereby the availability of oxygen becomes gradually sufficient. In fact, as time passes the CW reaches the proper RpM and air is finally compressed inside the intake manifold. To summarize, during acceleration the conventional turbo compressors (centrifugal compressors in particular) are unable to provide oxygen to the engine for a time period depending on engine load and rate of acceleration. During this time a severe production of particulate (especially when heavy fuels are considered) is discharged into the environment. To eliminate, or minimize, the turbo-lag phenomena, some engine manufacturers utilize different mechanical compressors (i.e. positive displacement compressors) which show a reasonable efficiency at low RpM. These mechanical systems are coupled with the engine crankshaft, thereby utilizing power from the engine to operate (less efficient). When these devices are utilized the production of pollution is reduced during acceleration, but unfortunately engine performance is also penalized, especially at high engine RpM. The only commercial alternative widely used (for example for large diesel engines) is to utilize two different air-enhancing systems in tandem Therefore, a positive displacement air compressor, utilizing power from the engine, and a centrifugal compressor are coupled so that one provides oxygen at low RpM, while the other pressurizes the intake manifold at higher RpM. This solution is very expensive and results only in a modest improvement of the overall engine efficiency. Another way to provide excess oxygen inside the intake manifold at low engine RpM is represented by electrical compressor. These compressors are generally characterized by an electrical motor coupled with a centrifugal compressor able to provide excess oxygen to the engine independently of engine RpM. Generally, these electrical motors are controlled by sophisticated and expensive electronic controllers, and require extremely high current densities to provide the needed torque in a few hundreds of milliseconds. In other words, these compressors are capable of providing the needed oxygen at low engine RpM, but unfortunately they require extremely high electric consumption for their operation. The high current densities required for the electrical air compressors also poses serious problems by originating large emissions of electromagnetic interference, and by generally overloading the conventional electrical systems (i.e. alternator, batteries) aboard the vehicles. Therefore, although the electric compressors satisfy the requirement for oxygen at low engine RpM, they also require so much power to run that the overall energy balance might actually show a deterioration of the overall engine performance instead of the opposite.

The main objective of the proposed invention is to provide a waste energy recovery system capable of reducing environmental pollution while increasing the engine performance. Therefore, this invention converts heat into mechanical energy which can be used to produce electricity, air pressure, or availability of thermodynamic work.

SUMMARY OF THE INVENTION

One of the main objectives of the proposed invention is to provide an anti-pollution device while increasing the power system's overall performance without affecting the fuel specific consumption. In general, this invention consists of a special thermodynamic engine coupled with the power system, the waste energy of which is the source of energy of the thermodynamic engine. Because the converters and expanders utilized are extremely compact, the overall MWHE can be easily assembled/integrated with a conventional IC engine. Superheated vapor is generated by injecting a relatively low-pressure fluid with the desired thermodynamic and thermal physical properties (i.e. water or any proper fluid) inside a special heat transfer converter which transfers the heat released by the cooling system and exhaust gases of the engine to the fluid instantaneously. In general, by considering a 50–60 horse-power (HP) engine, about 20–24 kW (where 1 kW=1.341 HP) are normally lost in the form of heat irreversibly discharged into the environment. This heat is normally lost through the exhaust gases and forced convection through the engine coolant system and radiator. The minimum energy required to accumulate enough oxygen inside the intake manifold when the engine is accelerating from idling to higher speeds can be estimated between 0.8–1 kW for a small volume engine, and about 3 kW for a medium large diesel-fueled engine. Normally the efficiency of a standard centrifugal air compressor is not greater than 60–70%, therefore the energy required at the compressor shaft is about 3.2 kW. A device utilizing a 20 kW energy source to convert it into 3.2 kW minimum energy required to provide compressed air should have an efficiency of at least 16%. Such a low efficiency is normally not even considered for power generation; however, in this case the energy source is waste energy and recuperating even a small fraction of it only represents a gain for the overall engine efficiency. Therefore, the thermodynamic cycle of the NWHE is a vapor cycle based on an injection of water (or a proper fluid) into the heat transfer converter which instantaneously flashes the water to superheated steam with no need for steam boilers or accumulation (as is for conventional vapor cycles). The pressure of the water injection and the mass flow rate can be varied as a result of the quantity of heat available inside the converter, or simply as a function of the amount of waste heat that we want to recuperate. Once water is injected inside the converter it expands instantaneously, changing its specific volume and making the heat transfer process extremely rapid. The energy collected by the superheated steam while transiting inside the converter is then utilized inside one or more expanders able to provide power directly to the crankshaft, and/or drive the oxygenators. If the engine is a medium-large volume engine the production of waste heat is greater than the heat necessary to only drive the oxygenators. In this case, the excess superheated steam energy can be utilized to drive an additional expander that returns (directly or indirectly) mechanical energy to the engine crankshaft. To summarize, the MWHE can be formed by one or more heat converters, and at least two expanders. One expander is coupled with the engine load through a special clutch, and the other provides a constant optimum speed for a special centrifugal-type compressor forming an air/oxygen enhancing system (oxygenator) powered by waste energy. The superheated steam formed inside the converter then expands in the expanders and condenses inside a radiator, or as a result of steam collapsing when exposed to the cold surfaces of chambers inside the expander (imploding systems). Furthermore, the sudden implosion of vapor inside the imploder chambers causes a drop in the system pressure (i.e. $P=0.09$ bar when $T=45$ C.°) which increases the efficiency of the MWHE thermodynamic cycle. At this point the condensed fluid (back in its liquid form) is pressurized back into the injector, and a new cycle starts over. By rough estimates, it is possible to assume that if the maximum temperature reached by the superheated steam inside the converter is only 450 C.°, the overall efficiency of the waste heat thermodynamic cycle is approximately 21%. This means that a vapor cycle with the above characteristics could provide at least 3.4 kW shaft power to a compressor of whatever type. In other words, the thermodynamic engine described in this invention can be utilized to power an air/oxygen enhancing system at no cost for the overall energy balance of the engine. If the converter provides a superheating temperature greater than 450 C.°, for example 600 C.°, the overall efficiency of the thermodynamic cycle would reach 29%. The maximum temperature achievable by the superheated vapor inside the converter is proportional to: the length of the converter: the distance between heated surfaces inside the converter; the roughness of the converter internal surfaces; mass flow rate of liquid fluid to be converted into vapor; mass flow rate of exhaust gases transiting inside the converter; thermal insulation between converter and surrounding environment; and many other less crucial variables. In general, exhaust gases temperatures can reach values higher than 600 C.°, and the relative efficiency of the converter can be much higher than 29%.

To summarize, the device of this invention recuperates a fraction of the energy normally lost in the form of heat from conventional power systems and combustion engines. By utilizing this energy to drive oxygen enhancing systems, engine pollution can be drastically reduced while engine performance is increased. By utilizing this same energy to drive a work-producing unit, the overall engine efficiency can be further improved since more power can be provided to the engine load. Then the overall engine power output is a result of the summation of the power normally provided by the engine and the power recuperated from the waste heat.

DESCRIPTION OF THE PREFERRED EMBODIMENTS

The working principles of the MWHE of the present invention are now described by utilizing the schematics and representations shown in FIGS. 1–18.

Figure 1:
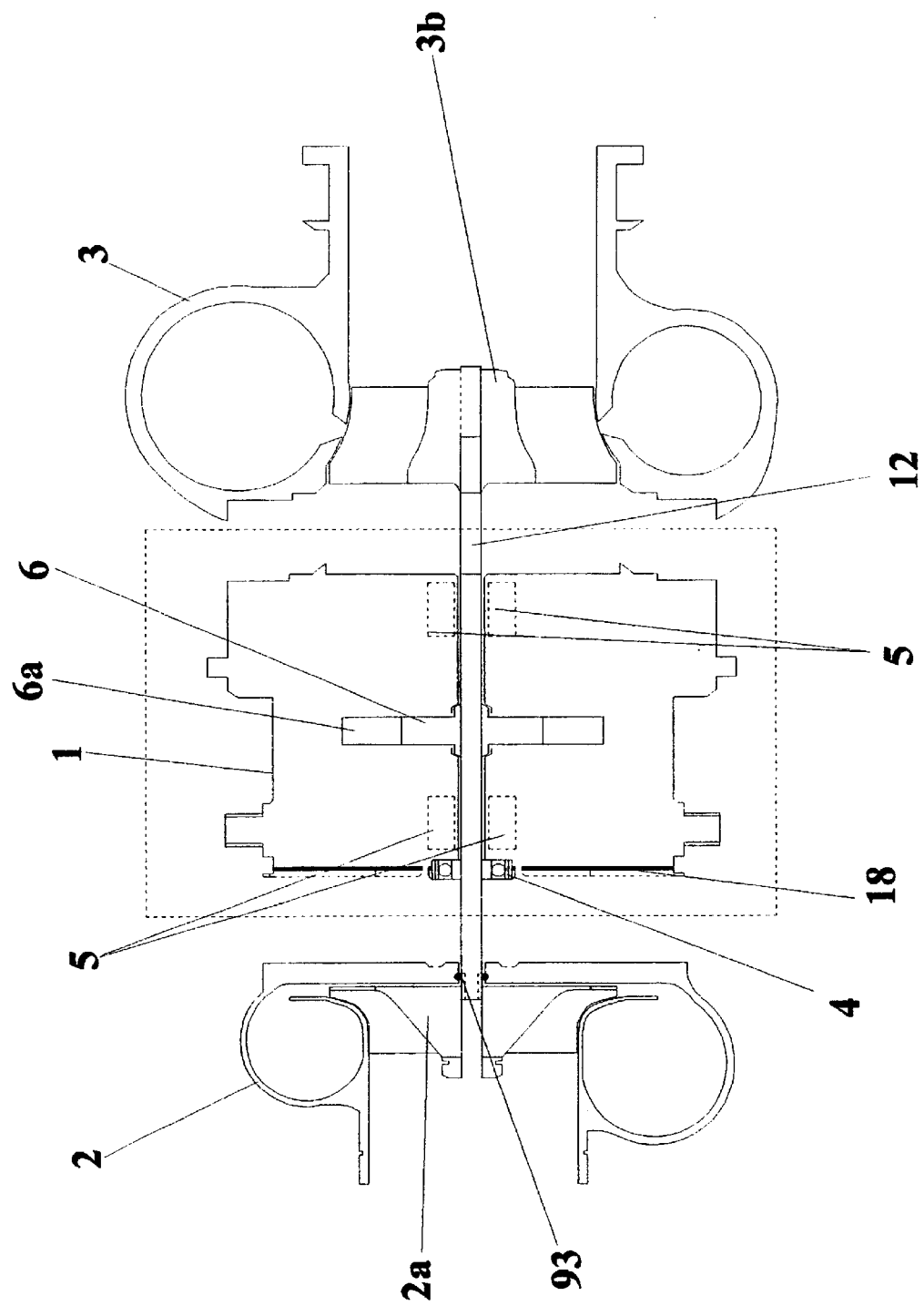
FIG. 1 is a representation of a basic centrifugal air compressor within which an additional work-producing unit is added in the central body of the compressor, thereby forming an intake air-enhancing system which utilizes the exhaust gases kinetic energy in tandem with the expansion of superheated vapor inside an expander coaxial with the CW.
Figure 16:
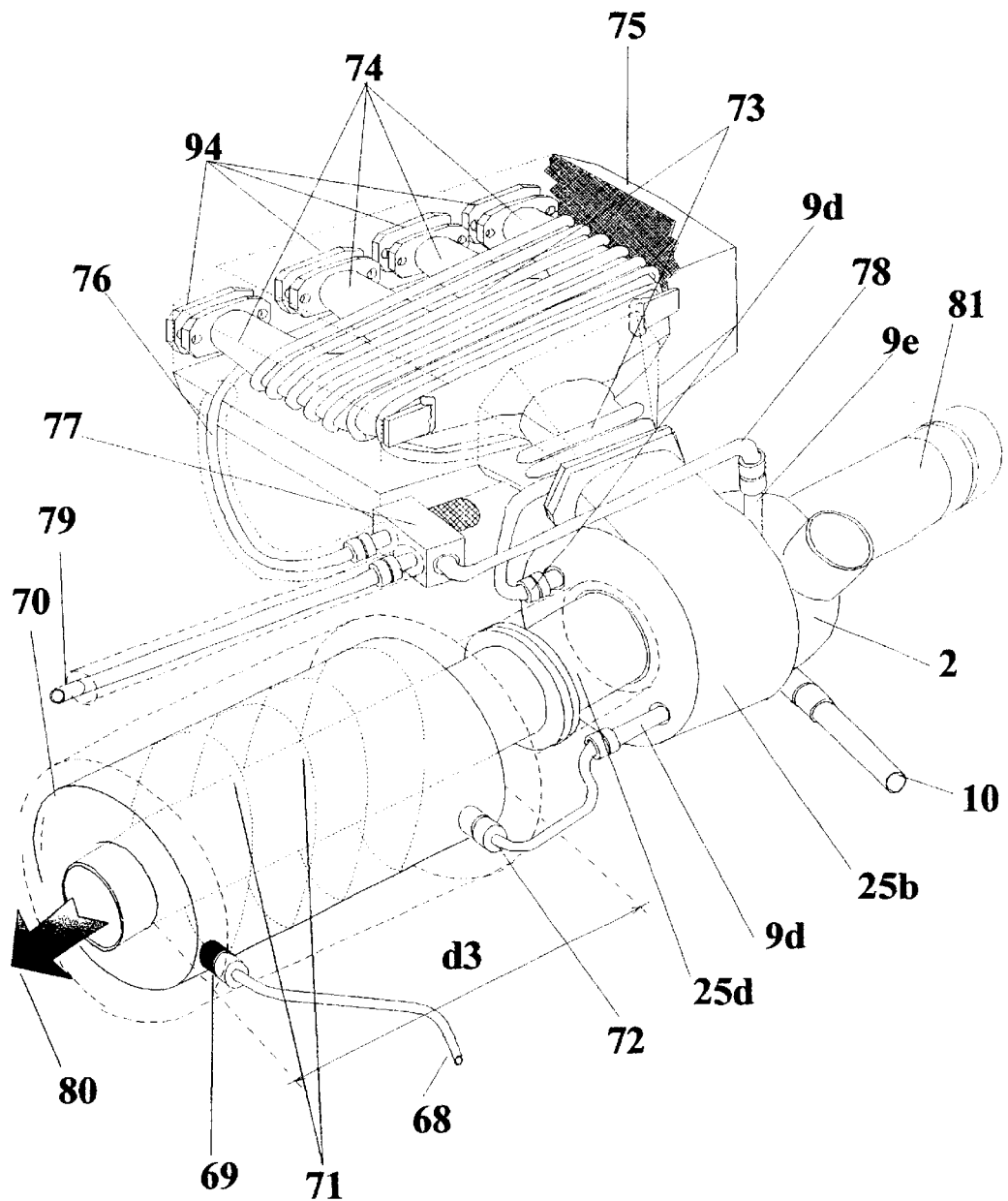
FIG. 16 shows a hydraulic circuit similar to that shown in FIG. 15. In this Figure the connection of the various converters allows further superheating of the vapor and increases the overall efficiency of the MWHE.
Figure 17:
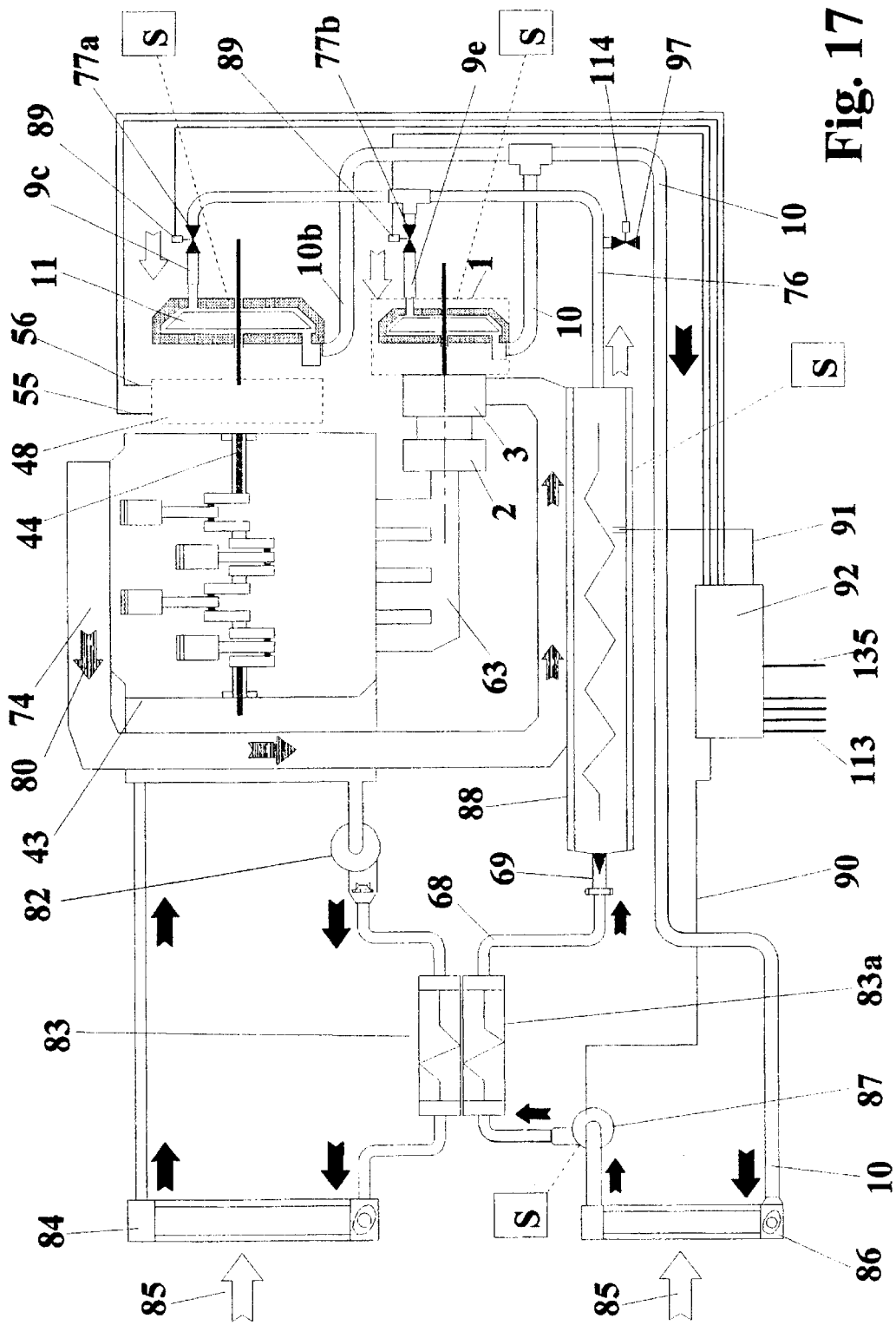
FIG. 17 is a schematic representing the thermodynamic cycle made by the fluid (i.e. water or any proper fluid) from the condenser to the converter(s), to the expander(s), and back to the condenser.
Figure 17A:
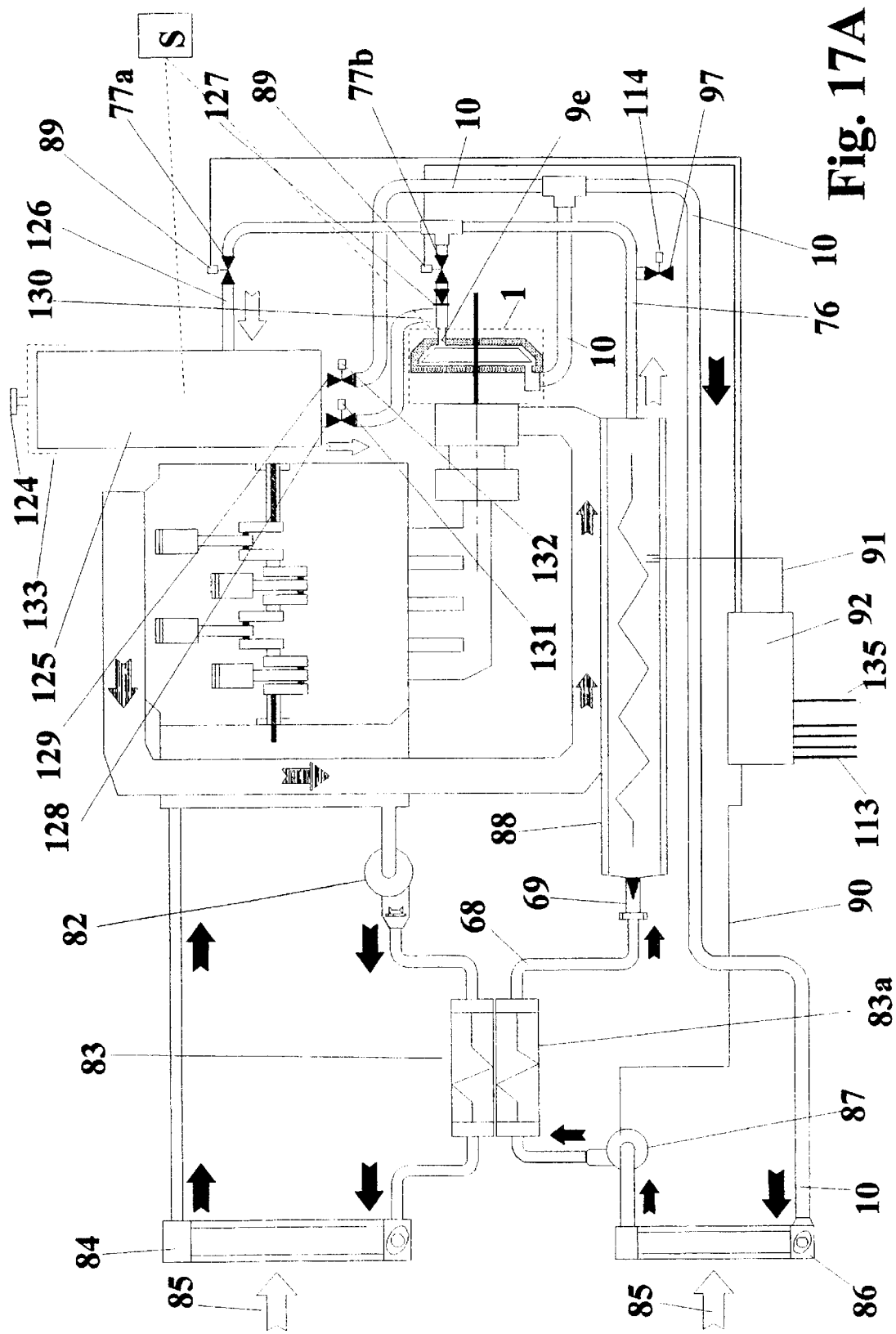
FIG. 17A is a schematic representing the thermodynamic cycle as shown in FIG. 17 with the addition of a high pressure insulated accumulation tank in which excess waste heat can be accumulated to pulse the expanders.

The thermodynamic steps of the MWHE's cycle are represented in FIGS. 17, and 17A. Since the MWHE is formed by the combination of several subcomponents, each of them characterized by unique features, the description of the MWHE should be somewhat simplified by describing the subcomponents first. The most important subcomponents of the MWHE cycle, expanders, converters, imploders, oxygenators and their applications are described in FIGS. 1–16. FIGS. 17 and 17A, and basically provide the overall hydraulic connection and method of operation of each sub-component as part of a single device: the MWHE as a plant. Therefore, the basic components of a centrifugal compressor modified to integrate the vapor expander block of the MWHE are shown in FIG. 1. The body of the expander 1 is comprised inside the dashed block of FIG. 1. The vapor expander 1 contains at least one bladed Expander Wheel "EW," 6, with blades 6a designed to provide the proper torque at a desired mass flow rate and thermodynamic properties of the vapor. The material of the wheel itself can be metal, composite, or a combination. In general, the material of the wheel has to have enough strength to sustain the mechanical stress imparted by the vapor, and it has to have good thermal stability at the operational temperature imposed by the expanding vapor. The outermost edges of the tips of blades 6a can be made of a sealing material (i.e. Teflon), which becomes softer when its cross section is sufficiently thin, offers good lubricating characteristics, and forms a good seal between the rotating parts of the wheel and the static casing 1. The shape, the height, and angles of the blades 6a of the EW are designed such that the maximum torque is obtained at a desired RpM, thereby matching the optimum RpM of the air CW 2a, inside the diffuser 2. EW 6 is also co-axial with the EGW 3b, and the CW 2a. All of the wheels 6, 2a, and 3b are mechanically coupled to the same shaft 12 pressure-sealed in various points (not all shown in FIG. 1) by a series of o-ring seals 93 or similar. Inside the expander block 1, there is at least one thrust bearing(s) 4, and/or fluid lubricated bearings 5 of conventional design, or of special design as described in FIG. 4. To achieve a good thermal insulation between the expander casing 1, and the air compressor sections formed by the CW 2a, and casing 2, a thermal seal 18 is positioned between the compressor parts and the expander body 1. In this configuration the thermal insulation 18 is necessary to prevent heat from the expander from being transferred to the compressed air inside diffuser 2.

Figure 2:
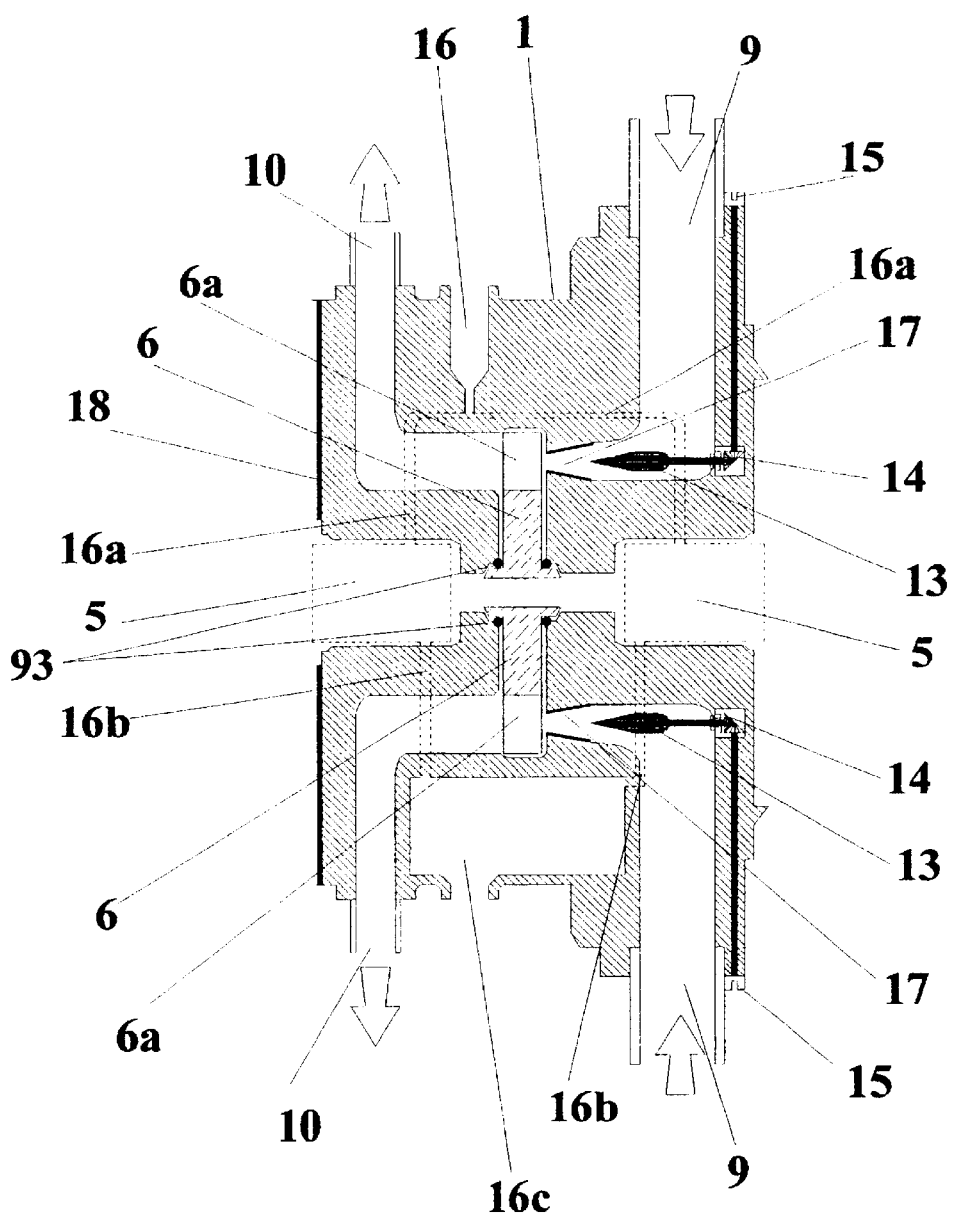
FIG. 2 is a sectional view representing the mechanical parts of the work-producing unit which can be assembled inside the body of widely used centrifugal compressors. This work-producing unit includes active means for the optimum regulation of the expander speed along with an autonomous and innovative lubrication system.

In FIG. 2, expander 1 is shown in detail. The superheated vapor generated in the converters described in FIGS. 5, 6, 15, 16, and 18 enters inlet 9 (FIG. 2) which can be positioned symmetrically with respect to shaft 12 of FIG. 1, or they can be positioned anywhere on the expander body 1. If water is the working fluid of the MWHE (any fluid with the proper thermodynamic, and physical properties could be utilized), superheated steam at a desired pressure and temperature enters inlets 9 and flows through nozzles 17. Nozzles 17 can be simple converging static nozzles, designed to obtain a desired pressure-to-velocity conversion, or they can be actively actuated or statically tuned through means 15, 14, and 13. These means allow the pressure and velocity of the steam to be finely adjusted before it expands through blades 6a of EW 6. Regulation means 14 consists of a mechanical link able to insert or withdraw a special needle 13. In this manner the expander can be customized to operate at an optimum speed as a function of the mass flow rate and thermodynamic properties of steam entering through inlets 9. Nozzles 17 are positioned inside the body of the expander 1 in a way that the forces generated against blades 6a counterbalance the forces acting on the shaft 12 (FIG. 1). This reaction force is proportional to the mass of steam impinging on the blades 6a. Once steam expanded though EW 6 it can exit expander 1 though the discharge paths 10 which are hydraulically connected to a condenser/radiator 86 shown in FIGS. 17 and 17A. Lubrication of bearings 5 is accomplished through an oil tank 16, oil paths 16a, and 16b, and a sump tank 16c. The lubrication methods can utilize conventional designs via forced circulation of oil through an external pump, or through an innovative method shown in FIG. 4. Expander 1 can also be designed such that bearings 5, and the hydraulic oil paths 16a, and 16b, are not integrated inside the expander body (for example, bearings 5 could be positioned inside blocks 2 and 3 of FIG. 1). To minimize heat and pressure losses between the EW 6 and the static block of expander 1, a series of proper seals (o-ring, graphite, etc.) can be positioned as indicated by number 93. As an additional sealing mean between the blades 6a and the static components of expander 1, a Teflon coating of the volume surrounding the wheel and on the EW 6 itself can be utilized. For example, if the wheel is made of Teflon, the tip of the blades can be molded (or machined) such that the flexibility of Teflon is utilized as a centrifugal seal. Then, a flexible portion of the blades, at the edge of the blade's tip, rubs against the casing containing the wheel. Since the casing is Teflon coated from the inside (or a Teflon ring is positioned around the wheel) the overall structure becomes sealed although the wheel is rotating and the case is static. Furthermore, the optimum lubricating characteristics of Teflon allow the seal to last a significant amount of time; however, any other sealing compound could achieve the same results. To minimize heat transfer from the expander body to the compressor body a thermal seal 18 is utilized as shown in FIG. 2. The material of this seal has very low thermal conductivity.

Figure 3:
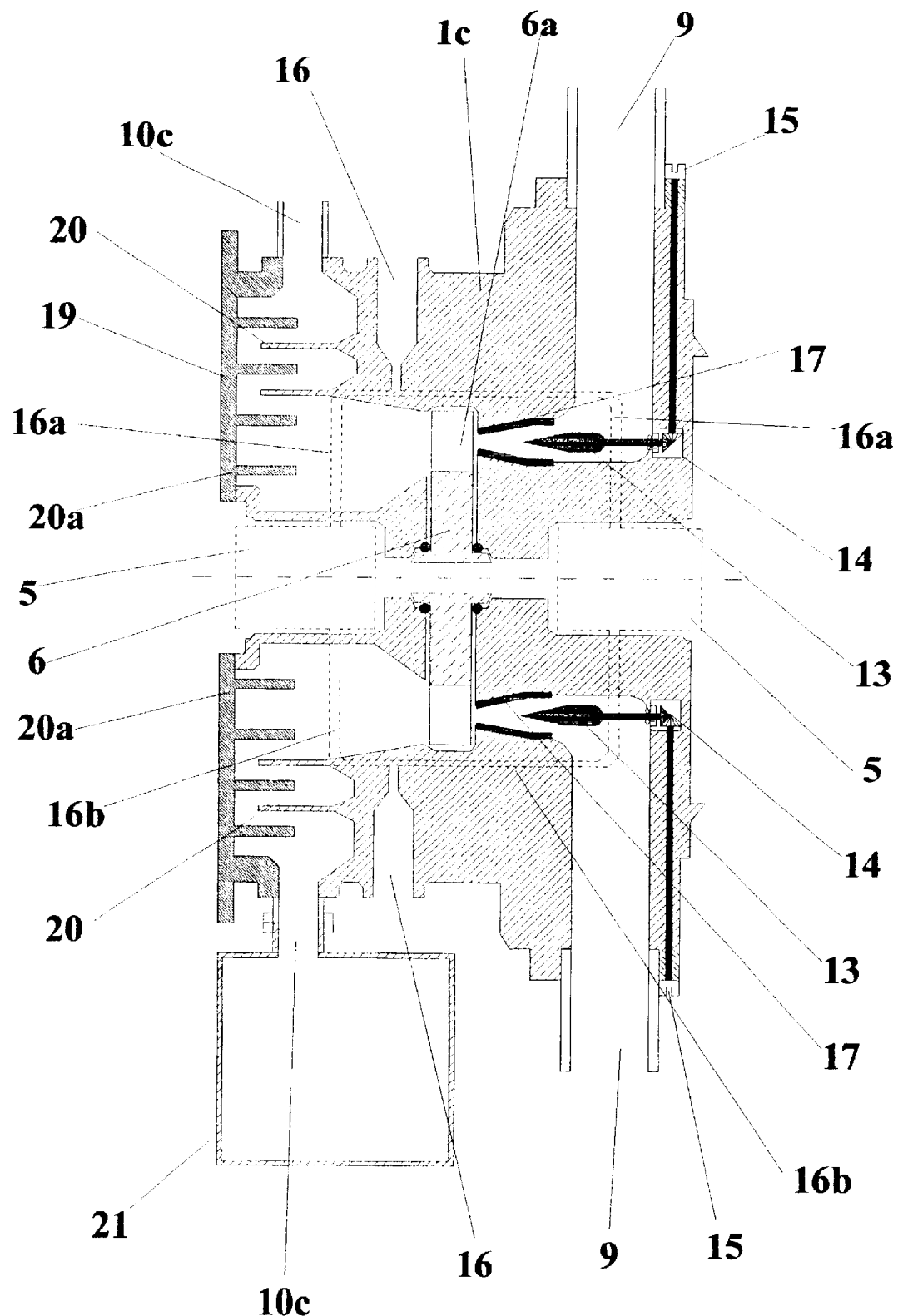
FIG. 3 is a sectional view of the central body of the expander which utilizes an internal imploding chamber/surface able to cause sudden vapor condensation.
Figures 3A, 3B:
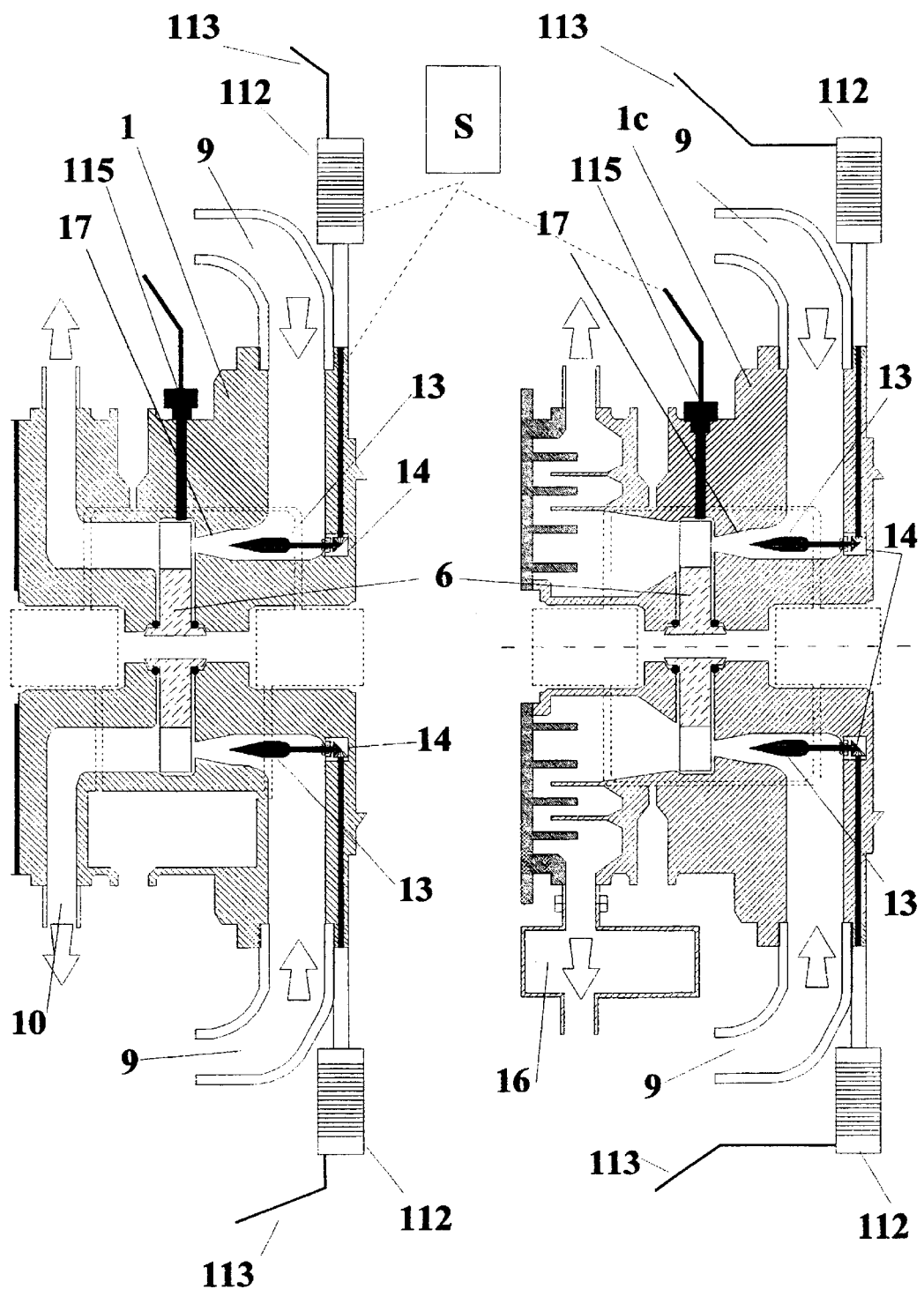
FIGS. 3A and 3B are sectional views representing the central body of the expander equipped with active servo mechanisms controlling and regulating special vapor nozzles.

In FIG. 3, the transfer of heat between the expander body 1 and the compressor body is instead favored. In this configuration steam exits the blades 6a and enters a condensation chamber formed by a hydraulic path defined by fins 19 and 20. In this manner, relatively cold air passing through the compressor cools down the surfaces of the condensation chamber and vapor implodes instantaneously. When steam suddenly condenses (implodes), immediately after its expansion through the blades of EW 6, it causes a steep pressure drop which increases the overall expander efficiency. The choice between an expander 1c of FIG. 3, or 1 of FIG. 1 is mainly based on a compromise between the desired air compressor efficiency and the efficiency generated by the combination of the various waste heat converters. In FIG. 3, steam enters the expander 1c from inlets 9 (here shown in a non-limiting symmetric configuration) passing through nozzles 17 where its thermodynamic characteristics in terms of pressure and velocity are adjusted actively or statically. Then, it expands through blades 6a and enters a forced cooling hydraulic path formed by fins 20 and 20a. Fins 20a have the purpose of extending the cooling surface area formed by fins 20a of component 19 in contact with large mass flow of the compressor intake air. As soon as steam enters in intimate contact with the surfaces 19, cooled by air, steam contracts suddenly changing its specific volume of a factor greater than a thousand. This sudden change in specific volume inside a system where the system volume is fixed provokes a steep drop in the local pressure. Decreasing the pressure at the discharge of blades 6a is equivalent to increasing the pressure at the exit of nozzle 17, thereby obtaining more thermodynamic work at the shaft of the expander (i.e. 12 in FIG. 1). Since the air flowing on the outside of the expander could be the same air/oxygen being compressed inside the engine intake manifolds, the temperature of the compressed air increases consequentially. However, since the mass of steam to be condensed is minimum with respect to the mass of air flowing inside the compressor side, the increase of air temperature is minimum, thereby affecting the air compressor efficiency only marginally. In other words, the pressure drop caused by the forced steam implosion causes an increased expander efficiency, while the consequential air temperature increase causes a lower compressor efficiency. However, the overall device efficiency increases since the gain in expander efficiency is greater than the loss of the compressor efficiency. In FIGS. 3A, and 3B the expander bodies 1c and 1 of FIG. 3 and FIG. 2 are shown side by side to show their major differences. In FIG. 3A, and 3B, the control of the EW 6 velocity is executed in a dynamic manner (active control), through means 13 able to adjust the diameter of nozzle 17 and control the thermodynamic properties of steam flowing through nozzle 17 via computer/controller 92, described in FIG. 17, or through a specialized sub-computer system, indicated by "S". Subcomputer system S, is a specialized controller which optimizes the operation of a particular subcomponent of the miniaturized engine (in this case the expander). Subcomputer system S can be interfaced with the computer 92 described in FIGS. 17 and 17A. Needles 13 are continuously re-positioned/adjusted through the servo mechanisms driven by motors 112. Motors 112 can be driven by electricity or be activated by pneumatic means. The basic control of EW 6 speed is executed via detection of the wheel speed through a movement sensor 115 (i.e. Hall effect sensor) connected to the computer 92 of FIG. 17. Computer 92 monitors the whole thermodynamic condition of the expander and heat converter(s) and adjusts the position of needles 13 proportionally to the amount of steam available, its thermodynamic state, the speed of the wheel and so forth. In this manner, EW 6 is always operated under optimum conditions.

Figure 4:
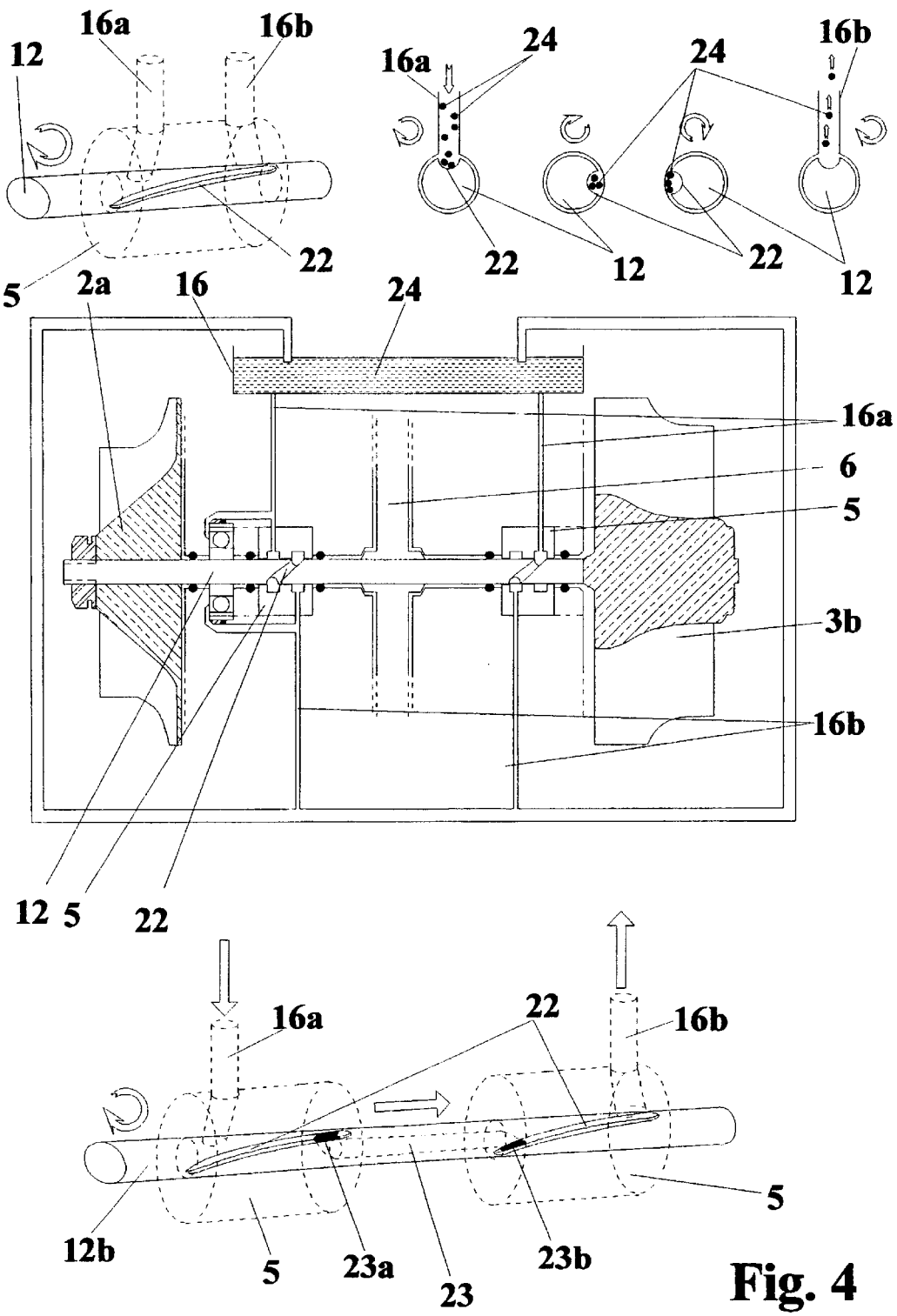
FIG. 4 is a schematic representing the hydraulic lubricating system and the pumping effect caused by internal blades embedded into the shaft.

In FIG. 4 a preferential hydraulic circuit for the lubrication of shaft 12 is shown. In FIG. 4, bearings 5 are represented in a non-limiting manner inside the body of the expander. Bearings 5 can be formed by bushing materials lubricated by the rotating action of shaft 12. Oil 24, or a lubricating fluid, inside tank 16 flows inside the hydraulic paths 16a and 16b forming inner channels and undergoes an acceleration through embedded blades 22 etched on the surface of shaft 12. In this manner, oil 24 gains kinetic energy inside blades 22 and converts this energy into potential energy. For example, oil molecules 24 (FIG. 4 top right), enter channel 16a and flows inside the internal blades 22 on shaft 12. Blades 22 are shaped in a way that the rotation of the shaft imparts acceleration to the oil as soon as the shaft reaches minimum speeds. In this manner the velocity at the end of channel 16b is higher than that at the entrance of channel 16a generating a pumping effect. Since shaft 12 rotates at reasonably elevated RpM, even a slight angle of blades 22 causes a desired pumping effect. Therefore, oil 24 inside tank 16 is forced by a depression in channel 16a to go through blades 22, lubricating the bushing or bearing 5 and returning back to tank 16 through channel 16b. In other words, lubrication of shaft 12, bearing or bushing 5 occurs as an automatic result of the rotation of shaft 12. The higher the number of revolutions per minute of shaft 12, the more oil is pumped through blades 22, therefore lubrication and cooling effects increase with increased shaft rotational speeds automatically. In general, blades 22 can be formed by micro-channels properly shaped on the surface of shaft 12 or 12b. The number of blades 22 can be even or odd as long as symmetry and/or balancing of shaft 12 or 12b is respected. The oil paths from tank 16 to the various bearings 5 can be made such that each bearing has its own oil inlet and outlet. Oil inlet 16a could be located at the inlet of one set of bearings 5 (FIG. 4, bottom), be accelerated by a first set of inner blades 22, flowing inside shaft 12b through hole 23a into channel 23 inside the shaft, entering the suction side of inner blade 22, through hole 23b, and finally being discharged into channel 16b which returns the oil back to tank 16.

Figure 4A:
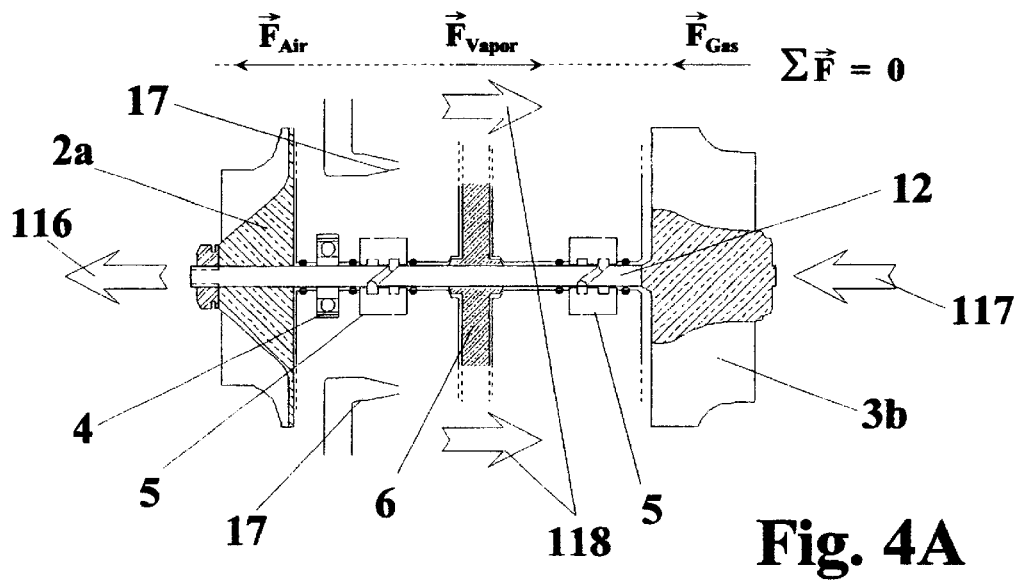
FIG. 4A is a sectional view of the expander in which the outlet nozzles are oriented in a configuration which offers a counter balancing force for the thrust bearings.

In FIG. 4A, the effect of the forces developed by the action of the EGW 3b, CW 2a, and EW 6 is represented. A solution to the wearing of the thrust bearing is now described. Thrust bearing 4, which can be positioned anywhere along shaft 12, normally has to counterbalance the reaction forces developed by the EGW 3b and the CW 2a. These forces are developed as a reaction to the motion of the exhaust gases and air on the blades of the wheels. When EW 6 of the vapor expander is integrated inside the body of the overall device (for example as shown in FIG. 1), it is possible to position nozzles 17 such that the reaction forces developed by the steam on the blades of EW 6 counter oppose the effect of the forces generated by all other wheels (i.e. 3b and 2a, FIG. 4A), thereby minimizing the wearing effect on the thrust bearing 4. By positioning and properly dimensioning nozzles 17, the net vapor force 118, indicated by $F_{vapor}$ could be of the same magnitude and opposite direction of forces 116 and 117 generated by wheels 2a and 3b and indicated on the vector diagram (FIG. 4A, top) as $F_{air}$ and $F_{gas}$. In fact, by assigning a positive sign to the forces from left to right, $F_{vapor}$ is positive, while $F_{air}$ and $F_{gas}$ are negative (the vector notation is not necessary since they all move about the same axis). By properly dimensioning the diameter of nozzles 17, along with the proper dimensioning of the waste heat converters, and the diameter of EW 6, it is possible to generate a reaction force 118 resulting from the momentum generated by the expanding steam In FIG. 4A, the direction of the forces represented is only indicative. If the expander is utilized only as an independent oxygenator (i.e. FIG. 8), EW 6 operates at constant RpM, (particularly the case for applications described in FIGS. 11, 12, and 13), therefore, it is possible to adjust the reaction force of the vapor ($F_{vapor}$) in a way that the axial forces acting on the thrust bearing are zeroed.

Figure 4B:
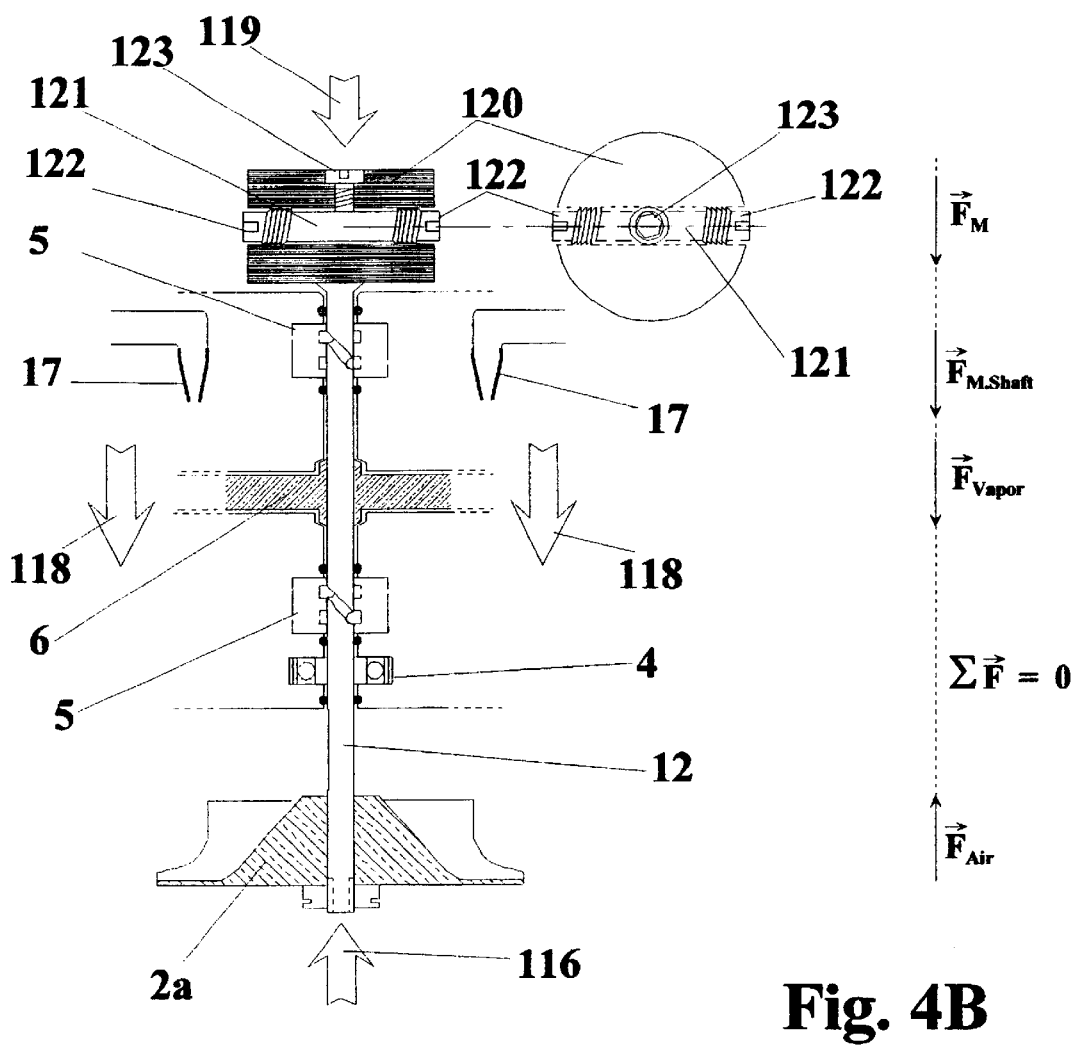
FIG. 4B is a sectional view of the expander coupled with a CW in an up-side-down configuration and equipped with a balancing variable mass system.

In FIG. 4B the expander is coupled with a flipped CW 2a (details of this configuration are described in FIGS. 8 and 9), and it is equipped with a balancing system which acts on the rotating masses and adds its own weight as a force opposite to the reaction force 116 of the CW 2a. Even in this case the proper dimensioning of the EW 6, along with the proper overall MWHE thermal properties, and the correct positioning of nozzles 17 inside the expander body can minimize the effects of the reaction forces caused by CW 2a and acting on thrust bearing 4. In this configuration the CW 2a is positioned in a way that it forms 180° from the position of the same wheel utilized in conventional centrifugal compressors. In this case, the axial component of the forces acting on thrust bearing 4 is mainly made by force 116 generated by the centrifugal compressor itself (pushing shaft 12 upward). If the body of the oxygenator (30, in FIG. 8) is positioned vertically, then nozzles 17 in FIG. 4B can be positioned such that the summation of the forces generated by the weight of shaft 12 (times the force of gravity, "FG"), the weight of the balancing mass 120 and 121 (times FG), generating force 119, and the resulting force 118 caused by the steam reaction on the blades of EW 6 could be exactly equal and opposite to force 116, thereby zeroing its effect. Similarly, if we significantly increase mass 120, or we utilize a heavy CW 2a (i.e. obtaining a flywheel effect), nozzles 17 can be positioned in a way to favor the effect of force 116. Balancing mass 120 and 121 also provides means to adjust the usual off-balance components of shaft 12, coupled with the various wheels. In fact, mass 121 can be moved from its central position through screws 122 and blocked in place by screw 123. The mass system formed by masses 120, 122, and 123 can be positioned anywhere along shaft 12 (the dimensions represented in FIG. 4B are not scaled). In this manner the balancing of the whole rotating system (i.e. shaft 12, CW 2a, EW 6, and eventually EGW 3b) can be executed once the unit is assembled.

Figure 5:
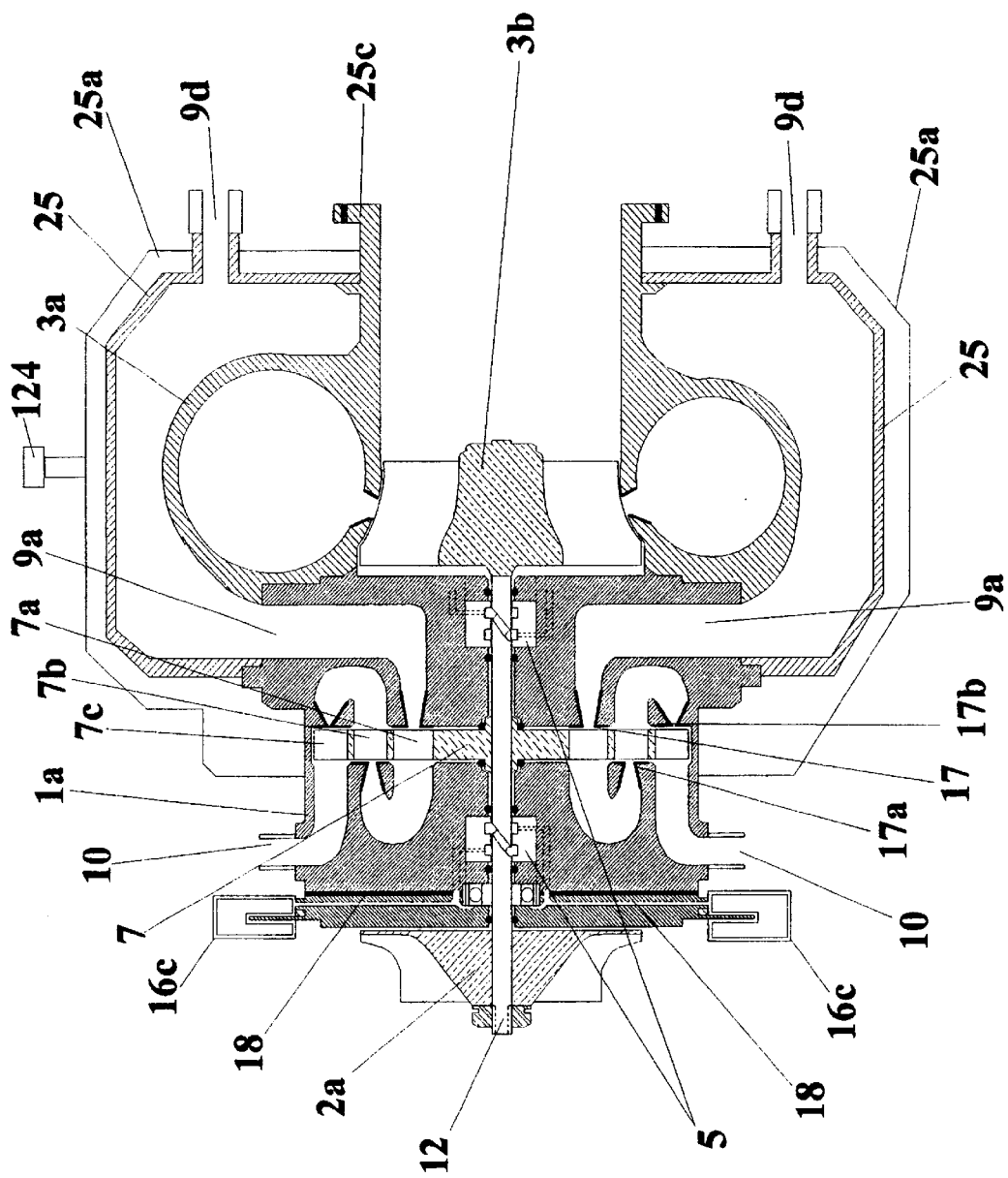
FIG. 5 is a sectional view of a special expander whose wheel contains multiple stage blades within the same circumference, coupled with a centrifugal CW and an EGW showing also an external jacket for the reutilization of the heat loss by the surfaces of the EGW casing.

An integrated vapor expander 1a positioned inside the components of a conventional turbo-compressor is shown in FIG. 5. In this Figure, expander 1a is formed by a special Multiple Stage Wheel, "MSW," 7, characterized by a series of blades 7a, 7b, and 7c, assembled molded, or machined inside the same wheel. Steam enters expander 1a through inlet (or inlets) 9d positioned on the body of a special jacket 25 containing the bodies of the centrifugal exhaust gas nozzle 3a and the EGW 3b. Steam is provided at the desired temperature, pressure, and mass flow rate by the converters described in FIG. 15, 16, 17, and 18. Again, steam enters at inlets 9d, receives additional heat mainly by convection and radiation inside the heat chambers formed by the surfaces of nozzle 3a and jacket 25, and plows inside the expander body 1a. To minimize heat losses, insulating materials can be utilized, or a vacuum chamber can be formed by evacuating the air inside another chamber formed by the surfaces of jacket 25 and those of an additional jacket 25a. Air can be extracted during manufacturing, or through a vacuum valve 124. Superheated steam now enters the expander body 1a and expands through the first set of converging nozzles 17 (the drawing is symmetric). The exit diameter of nozzle 17 is designed to transfer the maximum momentum to the first set of blades 7a of MSW 7. Again nozzles 17 can be fixed or actively adjusted as shown in FIG. 2 and 3. Normally, steam exiting this first stage of blades (7a) would enter a new stage of blades on a new separated wheel designed to match the new steam properties. In this invention a new series of blades 7b is still positioned on the same wheel (MSW 7), but has a different diameter and a different shape to compensate for the changed steam direction and its varied thermodynamic state. Therefore, steam loses a fraction of its energy by expanding through blades 7a, it then enters a new set of nozzles 17a (fixed or actively adjusted) after having changed direction by 180° through a polished elbow inside the body of expander 1a. Now, steam at certain thermodynamic conditions expands through the new set of blades 7b. Another converging nozzle 17b provides the proper adjustments in terms of steam pressure and velocity, since steam loses more and more energy as it expands in the various stages. Exiting nozzle 17b, steam expands again inside another set of blades 7c positioned on the periphery of MSW 7. Finally, the exhausting steam is removed from expander 1a through the discharge hydraulic paths 10, or through an imploding chamber (not shown) as described in FIG. 3. Therefore, the technique of turning the steam flow path of 180° allows the generation of more torque from the same wheel instead of three or more, thereby reducing weight, inertia, and allowing a significant miniaturization of the expander body. The lubrication system of expander 1a can be formed by a conventional oil lubricating system, through an external pump, or by a system that utilizes bearings 5 as described in FIG. 4. If the lubrication system is similar to that described in FIG. 4, the oil or an equivalent lubricating fluid, can be cooled through tanks 16c, assembled on the diffuser body of the air compressor. Since the maximum temperature of the air at the discharge of the CW 2a is only 1.5 to 2.5 times the air inlet temperature (generally below 40° C.), this section of the overall device can provide proper cooling for the lubricating fluid. To minimize heat losses from the expander body 1a to the air flowing inside the compressor, a thermally insulating seal 18 is positioned as a buffer between the two different bodies.

Figure 6:
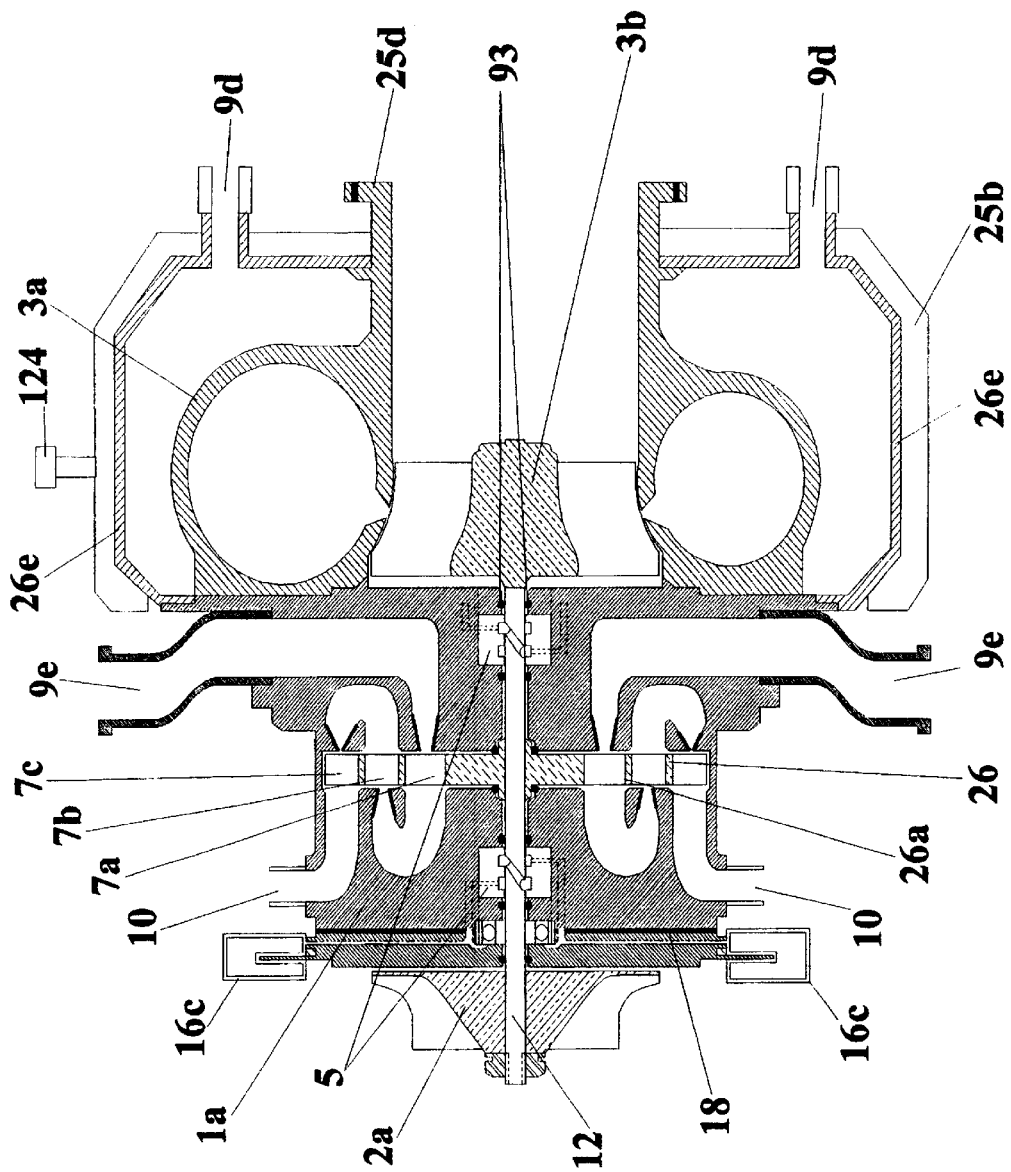
FIG. 6 is a sectional view of an expander similar to that described in FIG. 5 except that the vapor circulates inside a jacketed system surrounding the EGW casing independently of the vapor circulating inside the expander.

FIG. 6 represents an expander integrated inside the body of a turbo-compressor with characteristics similar to those described in FIG. 5. In this Figure the steam flowing inside the heat chamber formed by surfaces 3a and 26e occurs in a way that it can flow in and out the heat chamber independently of inlets 9e of the expander body 1a. The heat chamber is also thermally insulated by vacuum through valve 124, or by utilizing thermally insulating materials coating, or covering the external surfaces 26e (i.e. thermal blanket 25b). In this configuration, steam is superheated to certain temperatures, and then can be forced inside another heat converter to reach even higher superheating temperatures.

Figure 7:
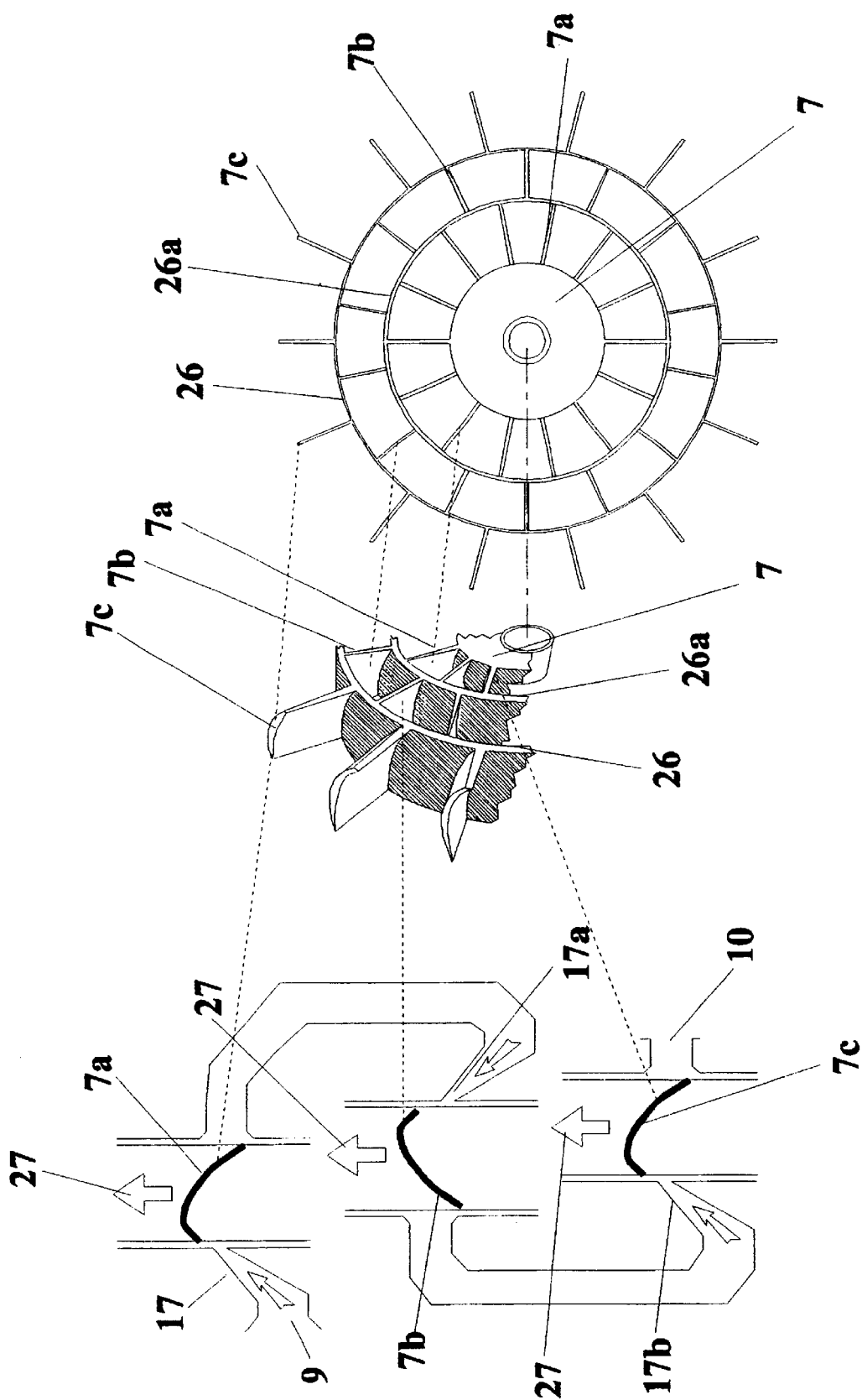
FIG. 7 shows a detailed representation of the multiple stage blades located on a single wheel, lighter, compact, and able to provide the torque of three equivalent wheels operating with vapor with different thermodynamic properties.

FIG. 7 represents MSW 7 with more details. To conserve the desired direction of rotation indicated by 27, the inclination/shape of blades 7a, 7b, and 7c changes in each stage. As shown in FIGS. 5 and 6, steam enters inlets 9, accelerates inside nozzle 17 and expands in the first series of blades 7a whose shape is designed to transfer the kinetic energy of the steam into mechanical energy at the shaft of the wheel. The shape of blades 7c, 7b, and 7a, represented in the drawings of FIG. 7 is only indicative. Now, steam exhausting blades 7a is redirected and enters a new nozzle 17a to expand through blades 7b. The inclination of blades 7b is different than that of blades 7a so that the rotational direction 27 is conserved. Finally, steam exhausting from blades 7b is redirected again and conditioned by nozzle 17b designed to convert low pressure steam into kinetic energy, and expands through blades 7c. At this point, the steam energy content is low and it can be discharged into condenser 86 (FIGS. 17 or 17A). Each series of blades 7c, 7b, and 7a is connected to the MSW 7 through sections 26 and 26a. The number of sections 26 and 26a can vary proportionally to the diameter of the wheel the mass flow rate of steam, and the torque required.

Figure 8:
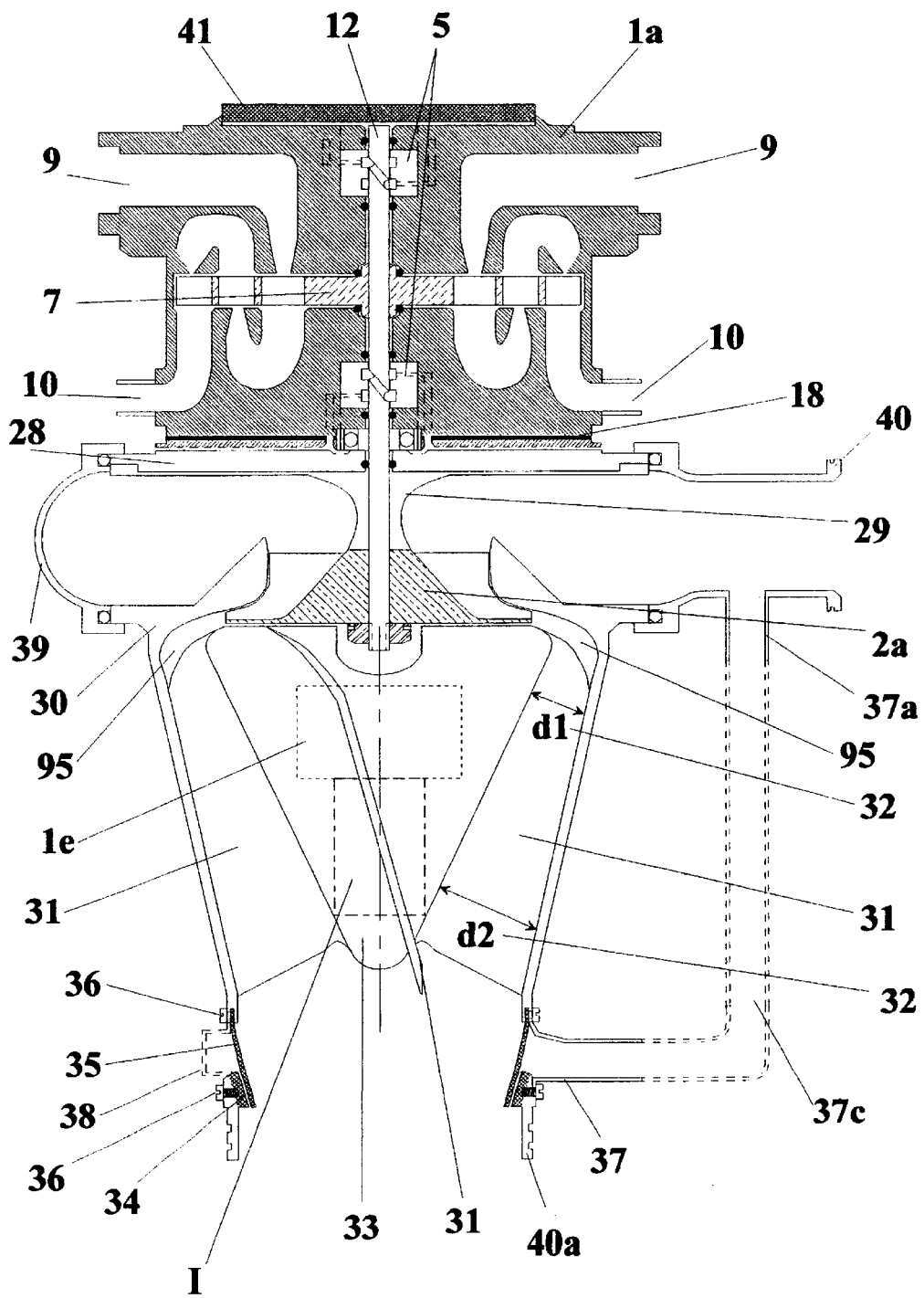
FIG. 8 is a sectional view of a special expander coupled with a centrifugal CW positioned with 180° rotation and having a discharge section formed by a diverging conical nozzle able to recuperate most of the kinetic energy of the air once leaving the blade tips of the CW. In this Figure a series of intake air by-pass valves are also shown.

An innovative centrifugal compressor (oxygenator)—completely symmetrical, easy to manufacture and utilizing simpler parts—is shown in FIG. 8. Again, the oxygenator is one of several sub-component of the MWHE. In this case, expander 1a is mechanically connected to a CW 2a assembled 180° rotated with respect to shaft 12. This configuration allows symmetry of the mechanical parts (easier to assemble and manufacture) and provides higher compressor efficiencies. Air flows through air path 40 and through an axial diffuser 29, entering the body of CW 2a and gaining kinetic energy as a result of the centrifugal action of the wheel. Air exits with the maximum energy at the tip of CW 2a's blades, and enters a diffuser specially shaped as indicated by region 95 in FIG. 8. This diffuser is symmetric and divergent along the whole length of body 30. The first transformation of the kinetic energy of the air into pressure occurs in region 95, and further gain in pressure occurs along fixed blades/vanes 31 regularly spaced on a fixed cone 33. The shape of vanes 31 is such that the turbulent motions and vortexes of the air at the exit of CW 2a (blades tip) are reorganized redirected and converted into pressure (useful energy). Furthermore, the cross section of the diffuser formed by cone 33 and the internal surfaces of body 30 makes a diverging nozzle. In fact, the cross section radially changes from small to large, as shown by distances d1 and d2, indicated by number 32. In this manner another component of the velocity of the air exiting the CW 2a is converted into pressure. Body 30 is mechanically linked to the expander 1a through coupling flange 28. Cone 33 and vanes 31 are static and fixed to body 30. To summarize, the body of the oxygenator is formed by two concentric cones having different height and diameter, or by a cone concentric and internally positioned inside a cylinder able to provide characteristics similar to those described by body 30. Flange 28 can be linked with body 30 through additional static fins/vanes (directing the air flow into CW 2a), or through an open semi-toroid body 39 surrounding the inlet of the oxygenator and providing the structure for the intake manifold 40. Manifold 40 can be easily connected to a conventional air filter. The overall device formed by the expander 1a and body 30 forms an oxygenator which can be designed to provide a minimum mass flow of oxygen sufficient to allow complete combustion from idling IC engine RpM to medium high RpM. If the outlet of the oxygenator 40a is connected to an engine intake air system equipped with a conventional turbo-compressor, membrane valves 38 could automatically open every time the pressure in the region adjacent the vortex of cone 33 is below atmospheric pressure. Therefore, the oxygenator could be designed to provide oxygen at low RpM, while the conventional turbo-compressor would start to operate properly at high RpM, so that the by-pass valves 38 allow the turbo-compressor to breathe even if the oxygenator is not dimensioned to provide the full range of mass of air at high engine RpM. By-pass valves 38 are formed by membrane 35 composed by flexible materials (i.e. rubber, composite) with the proper thickness, dimensions, torsion and physical properties. One by-pass valve 38 with the proper hydraulic diameter (effective cross section seen by the fluid), or more valves with equivalent air flow characteristics can be assembled on body 30. In general, expander 1a, 1 (or 1b as described in FIG. 14), can provide the propulsion necessary to CW 2a. If the expander is properly miniaturized it can also be inserted inside the body of cone 33, as indicated by dashed box 1c. In this case, steam inlet paths 9, and steam discharge paths 10 can be made through the thickness of vanes 31. Steam paths 9 embedded inside fins 31 would be thermally insulated, while the steam exhausting from EW 6, or MSW 7, would be exposed to the air-cooled surfaces of cone 33 and vanes 31. When the steam exhausting EW 6 or MSW 7 impacts the cold internal surfaces of cone 33 it suddenly condenses (implodes), generating a pressure drop which increases the overall oxygenator efficiency. This oxygenator can also be coupled with a conventional EGW 3b (and relative nozzle) by unplugging thermal plug 41 and extending shaft 12. In other words, by prolonging shaft 12 it is possible to add pulsed propulsion to the CW 2a by utilizing the kinetic energy of the exhaust gases. Expander 1a shown in FIG. 8 (or even expanders 1, or 1b) can actually be miniaturized to a point that it can be inserted inside the cone structure of the symmetrical oxygenator. In this case, the oxygenator body 30 would contain cone 33 and inside cone 33 the expander 1, 1a, or 1b. Then vanes 31 would contain hydraulic paths for the inlets 9 of expander 1a, and hydraulic paths for the vapor discharge 10. The inlet hydraulic paths 9, now embedded inside vanes 31, would be thermally insulated, while the discharge paths 10 are allowed to transfer heat and condense inside the hydraulic paths 10 (embedded inside vanes 31), since vanes 31 are always at low temperatures due to the action of the mass flow of air. By creating an implosion chamber inside cone 33, the surfaces of the cone provide the cooling surfaces for superheated vapor to suddenly collapse when in contact with the inner surfaces of cone 33. In this case, the symmetric oxygenator becomes extremely compact since its expander and implosion systems are all contained inside body 30. Furthermore, when a complete implosion occurs inside body 30 there is no need to circulate the vapor inside a condensing radiator (i.e 86 in FIGS. 17, and 17A), thereby further simplifying the miniaturized engine hydraulic path and connections.

Figure 9:
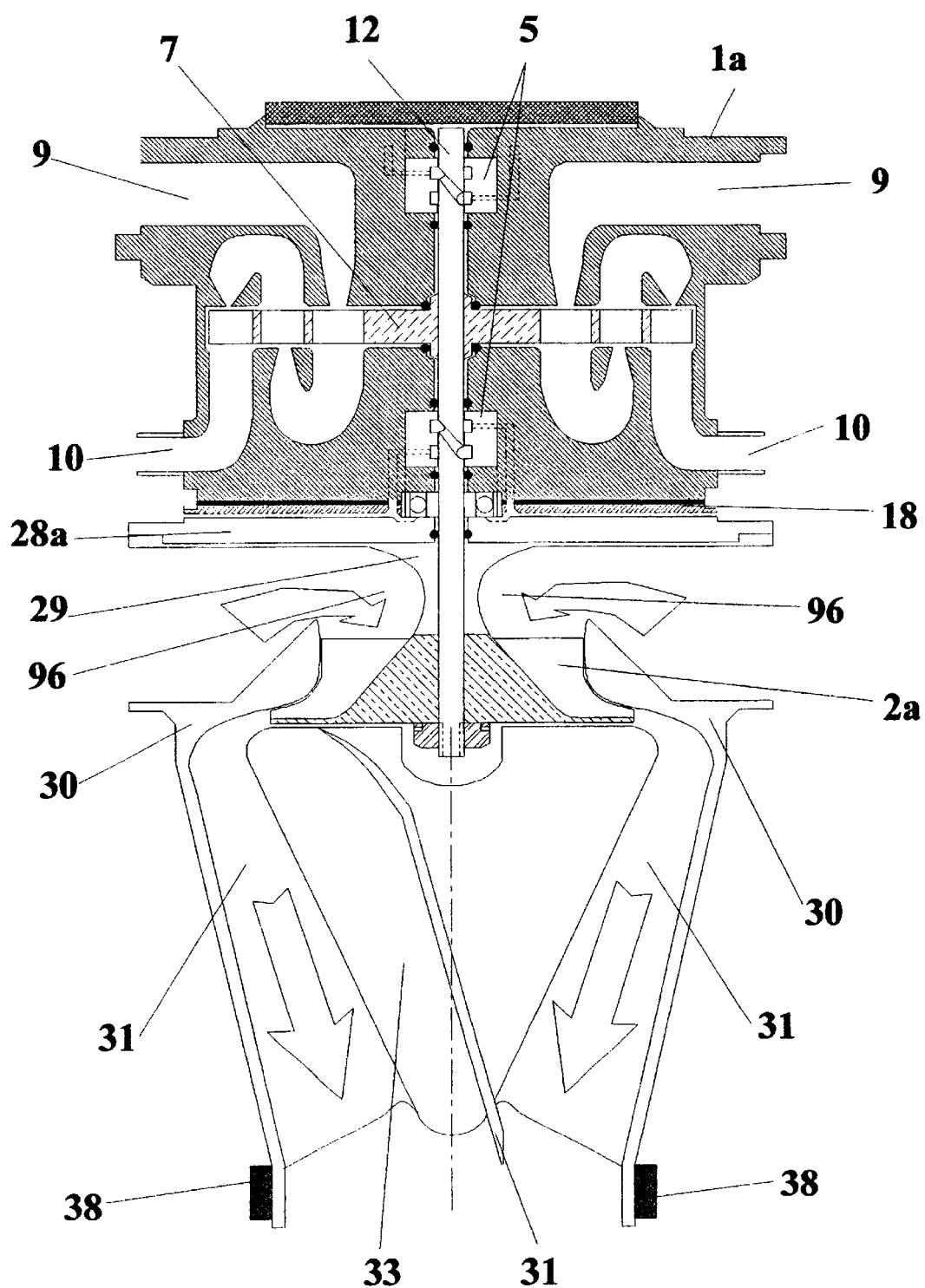
FIG. 9 is a sectional view of a centrifugal compressor coupled with a vapor expander completely symmetric for easiness of manufacturing and assembly.

Another symmetric oxygenator, similar to that described in FIG. 8, is represented in FIG. 9. In this oxygenator, air enters the body of CW 2a, passing diffuser 29, in a radial manner (from every direction). In this configuration a cylindrical air filter can be positioned between body 30 and flange 28a. To improve the efficiency of the CW 2a, static vanes can also be positioned inside the intake path 96. However, the oxygenator can also provide oxygen to the engine without an air filter assembled on itself (see FIG. 11). In general, EW 6, MSW 7, and CW 2a, can be made of plastic, Teflon, composite, metal or any material which maintains its thermal-physical properties for relatively low temperatures (much lower than the exhaust gases temperatures). If the MWHE is applied to a large IC engine, the amount of heat generated by the engine, recuperated by the converters, and transformed back into useful energy by the MWHE's expanders is much greater than the energy required only to power the oxygenators. Thus, the excess energy can be utilized in various ways. For example, it can be utilized to provide additional mechanical power to the IC engine itself.

Figure 10:
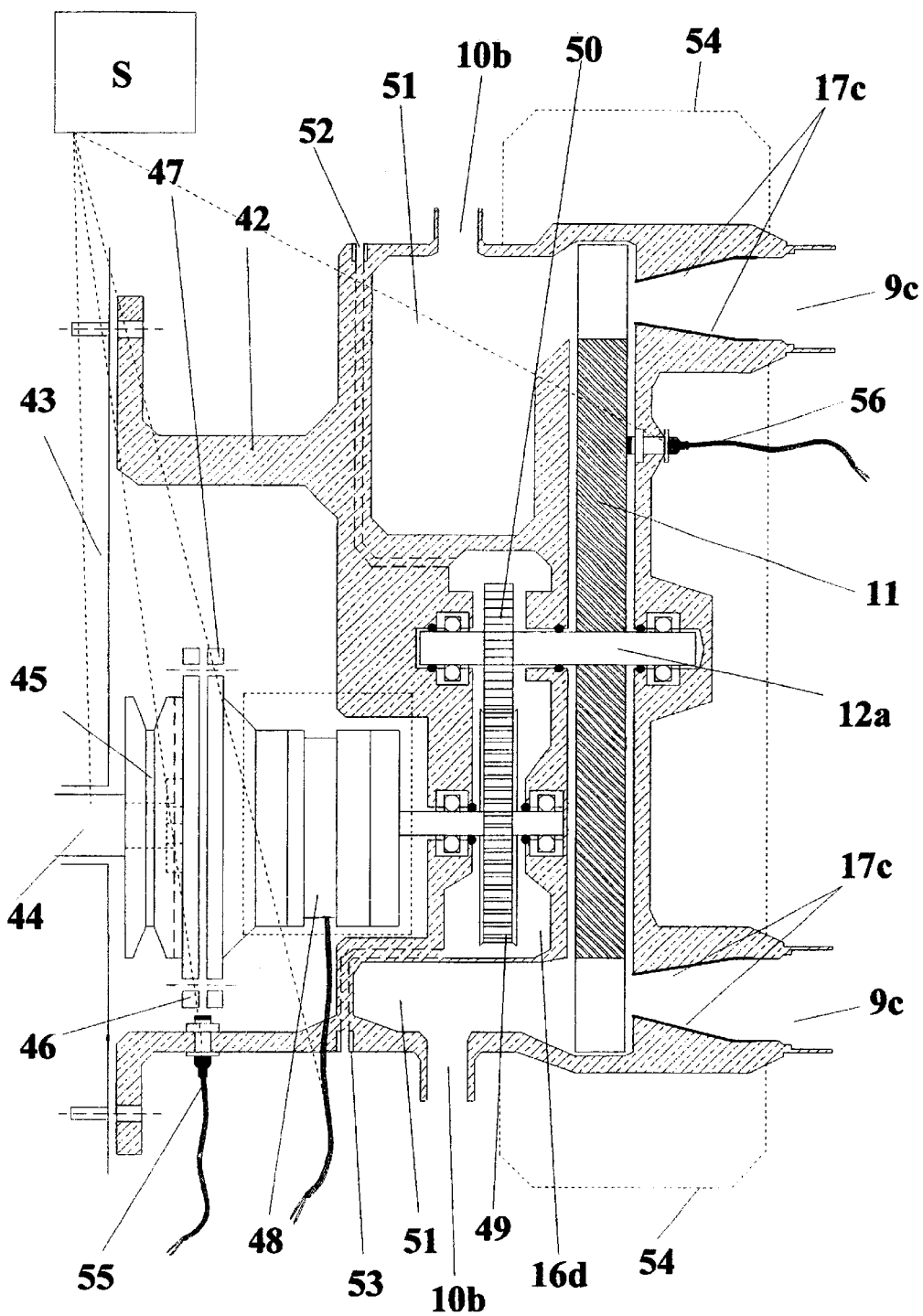
FIG. 10 is a sectional view of an expander forming a work-producing unit coupled via reduction gears to a centrifugal, mechanical, hydraulic, or electromagnetic clutch which transfers mechanical energy to the engine load.

In FIG. 10, an auxiliary pulsed or continuous power transferring system formed by the Auxiliary Expander Flywheel AEF 11 is shown. In this figure, the power unit comprised by body 42 is directly connected to the IC engine block 43. In general, power unit 42 can be connected to any load (i.e. an alternator for the production of electric power). In FIG. 10, the excess steam enters hydraulic paths 9c, and expands through the blades of AEF 11. AEF 11 is made of heavy materials to provide a large rotational inertia. Steam enters nozzles 17c and discharges into condensation chamber 51. A fraction of the steam condenses in this chamber; the remaining steam (steam with a low energy content) exits the power unit 42 through paths 10b and condenses in a condenser. By cooling chambers 51, the steam implosion effect described in FIG. 3 can be utilized to increase the efficiency of AEF 11. A speed reduction system formed by gears 49 and 50 may be necessary if the optimum efficiency of the AEF 11 is obtained at high RpM. The optimum parameters are mainly dictated by the amount of excess steam available and the gear reduction system might not be necessary if AEF 11 operates at RpM compatible with the IC engine RpM. AEF 11 is mechanically coupled to the IC engine crankshaft 44 by a modified pulley 45. The modification consists of a flange 46 mechanically linked to another flange 47 coupled to a clutch system 48. Clutch 48 can be hydraulic, magnetic, friction based, or a combination of any of these depending on the desired degree of accuracy when transferring power from the power unit 42 to the IC engine (or any load). For example, clutch 48 can be formed by oil whose viscosity at a given RpM provides the desired frictional torque. If an electronic clutch is utilized, sensor 55 monitors the speed of crankshaft 44, while sensor 56 provides analog or digital information on the speed of AEF 11. The electronic signals from these sensors become inputs (i.e. 135 FIGS. 17, and 17A) of a computerized control system (92 FIGS. 17 and 17A) which activates clutch 48 in a pulsed or continuous manner. In order for AEF 11 to provide power with the best efficiency, only a relatively small fluctuation of the AEF RpM should be allowed. Therefore, by utilizing the power provided by power unit 42 in a pulsed manner, the RpM of AEF 11 could vary only slightly. To minimize heat losses from the power unit 42, a thermally insulating material 54 covers the static parts of AEF 11.

Figure 11:
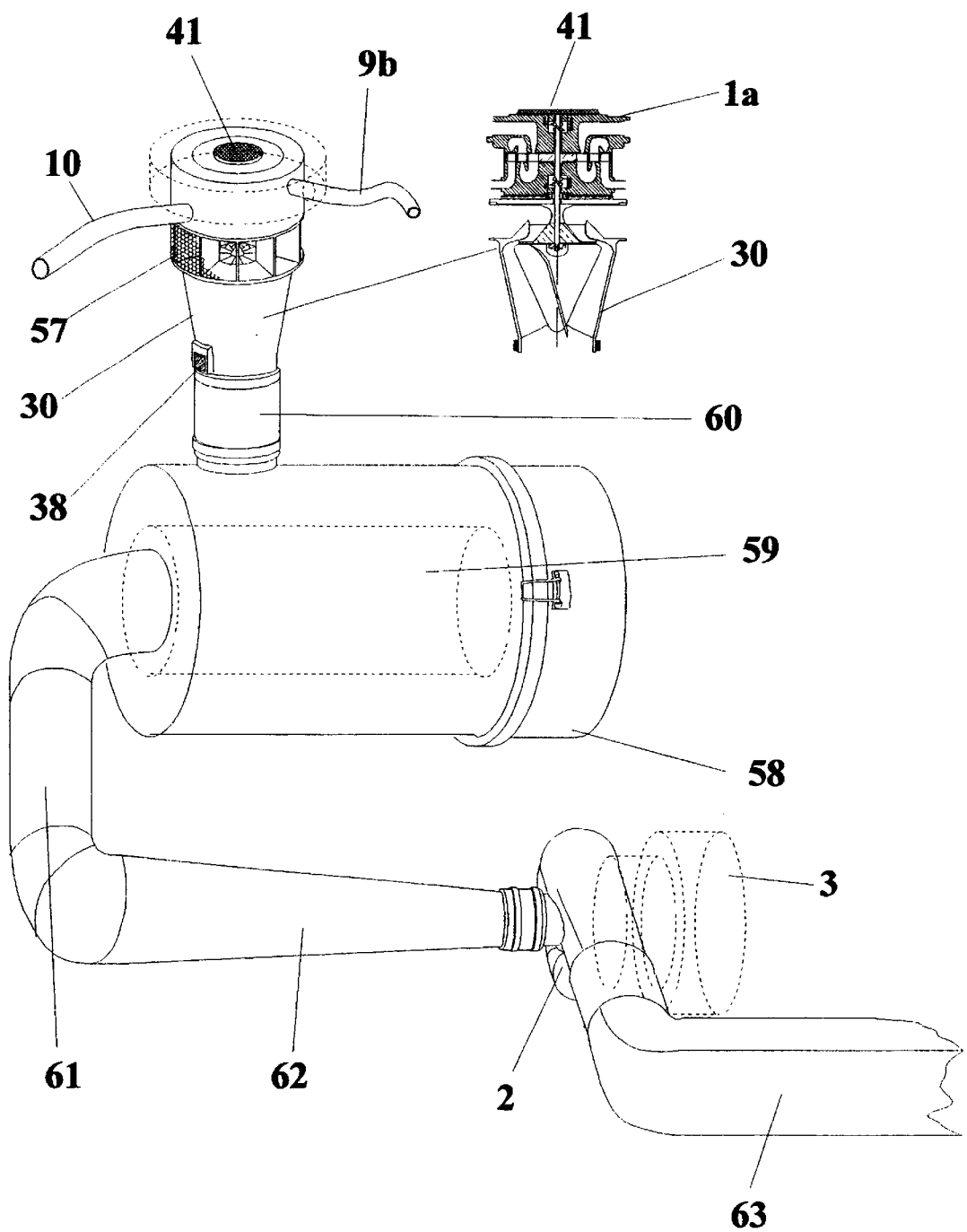
FIG. 11 represents the application of the expander-compressor unit as an oxygen enhancing system connected directly on the air filter barrel of the engine intake manifold without affecting the operation of existing turbo compressors or turbochargers already installed on the engine.

FIG. 11 represents one of the simplest applications of the oxygenator unit 30. In this Figure, the outlet of the symmetric oxygenator 30 is connected to the air filter inlet 60 positioned on the body surrounding air filter 59. Large IC engines normally have the air filter inlet formed by a tube vented to atmospheric pressure. The expander of this oxygenator could be of type 1*a*, 1 or 1*b*. The oxygenator shown in FIG. 11 utilizes expander type 1*a*. By applying the oxygenator as shown in this Figure, the whole engine air intake system is always pressurized without altering in any way the conventional turbo compressor 2 and 3 already installed. Air enters the protective filter 57 from all directions. Then it is compressed inside the air filter 59 which pressurizes the intake manifold 61 and 63 regardless of the IC engine RpM, or the status of compressor 2. When the IC engine accelerates, the sudden increase of fuel injected mixes with excess oxygen (thanks to oxygenator 30), providing a complete combustion and an extremely rapid response without producing toxic particulate and other pollutants during acceleration. If expander 30 is intentionally under-designed (not able to provide large mass flow rates once the IC engine reaches high RpM), the conventional compressor 2 gradually starts to compress air on its own (the IC engine is accelerating from idling to high RpM), thereby provoking a depression inside manifold 62, 61 and 60. As soon as the pressure inside manifold 60 is below atmospheric, by-pass valves 38 open, providing an easier path for air to flow inside compressor 2 now at full regime. Steam inlet 9*b* and outlet 10 are connected to a converter and a condenser, respectively (as seen in schematic in FIG. 17 and 17A). Since the expander unit 30 could accommodate for an additional EGW connected to its shaft, a plug 41 is inserted whenever this option is not utilized. If the oxygenator unit 30 breaks down, the IC engine operates as it did before the oxygenator was installed, thereby without impairing the IC engine (it would just decrease its performance and pollute again).

Figure 12:
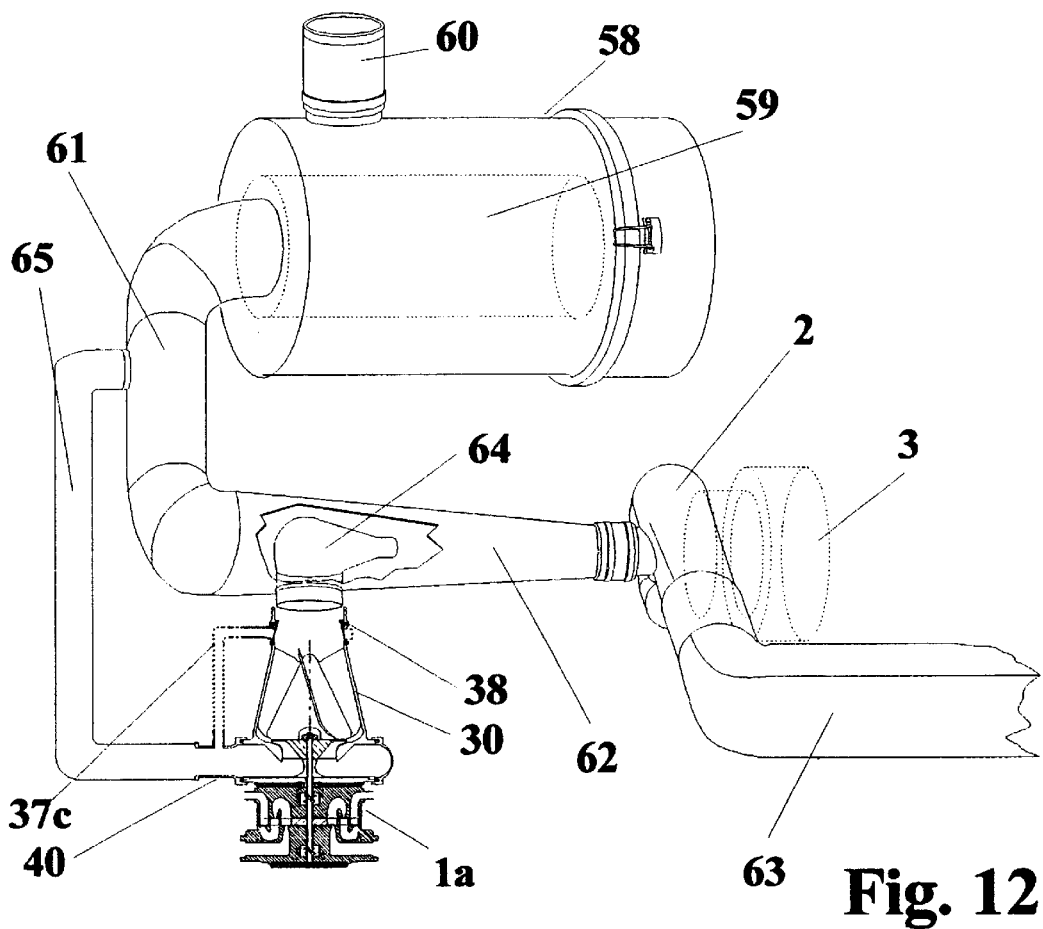
FIG. 12 represents the application of the expander-compressor unit as an oxygen enhancing system positioned inside the intake manifold utilizing a jet effect to pressurize the intake manifold. Again, this application does not affect existing turbo chargers or compressors already installed on the engine.
Figure 13:
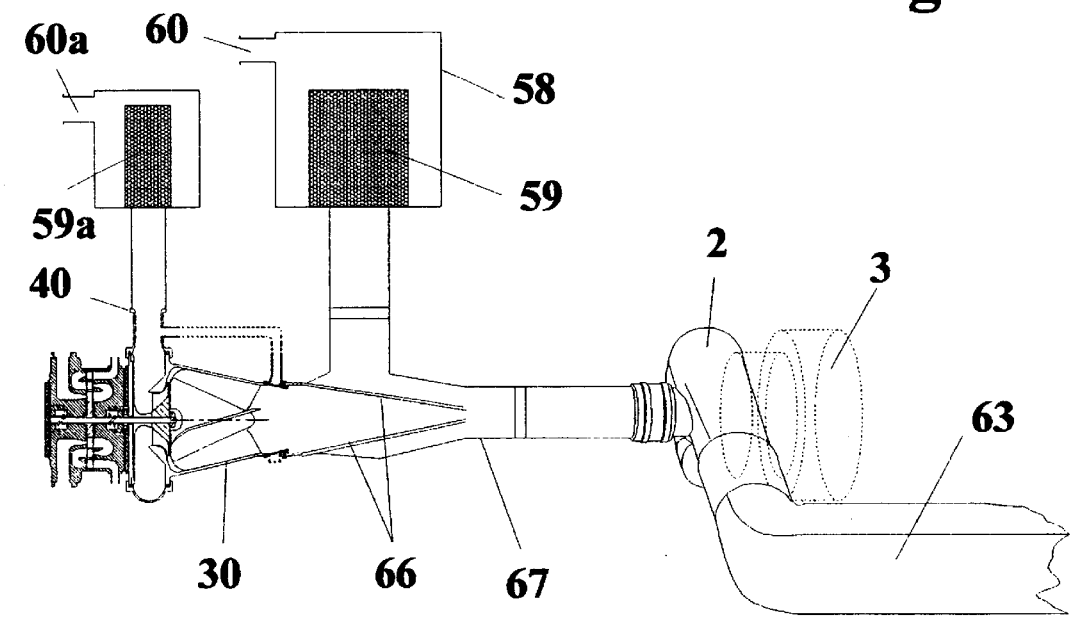
FIG. 13 shows the optimization of a conventional turbo compressor. In this case, the expander-compressor air/oxygen intake is independent and the pumping jet effect is optimized for higher performance at low engine RpM.

FIGS. 12 and 13 show the oxygenator unit 30 inserted inside the intake manifold circuit. In these configurations, the compressed air exiting the accelerating nozzle 64 or 66 is air filtered by filters 59, or 59*a*. Pressure inside the intake manifold is increased thanks to the jet effect caused by nozzle 64 or 66. Again, thanks to the oxygenator, powered by MWHE, oxygen is always available to the IC engine regardless of its RpM. Again, if the oxygenator is intentionally under-designed, the proper mass flow rate to the suction of compressor 2 is provided by by-pass valves 38. When the oxygenator is configured as shown in FIG. 13, nozzle 66 provides a more efficient output of oxygen to the intake manifold 67. To make the oxygenator air inlet completely independent from the IC engine air filter 59, an additional and independent air filter 59*a* can be connected to oxygenator 30 through a sealed connection to inlet 40.

Figure 14:
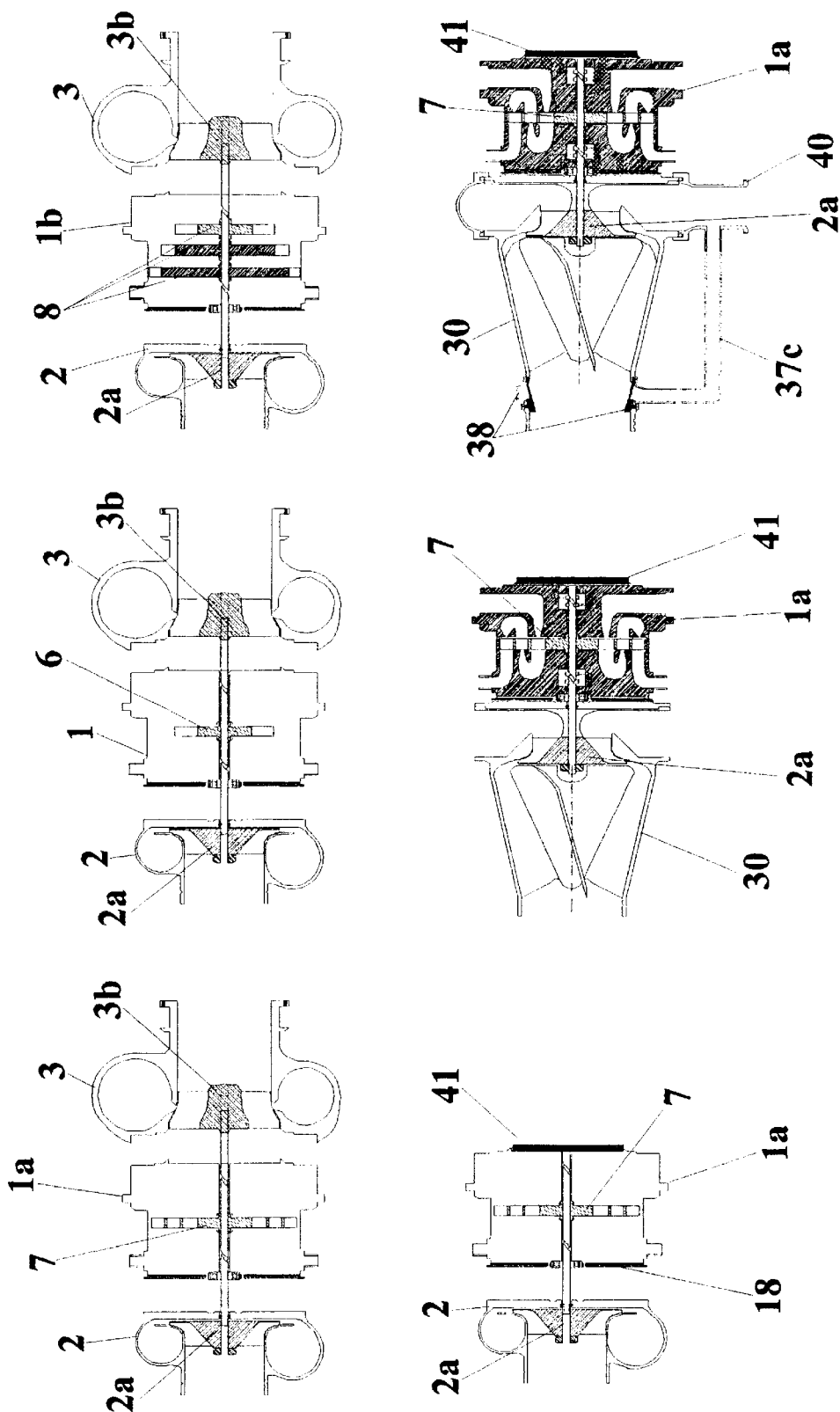
FIG. 14 shows a series of different configurations of the expander compressor unit by coupling the expander to existing compressor parts, or by coupling the expander to specially manufactured parts (i.e. special multiple stage blades wheel or symmetric parts).

To summarize the various expander-to-compressor configurations, a series of oxygenator units are shown in FIG. 14. From left top, expander 1*a* shows the ease with which the expander body 1*a* can be coupled with bodies 2 and 3 of conventional CW 2*a* and EGW 3*b*. In particular, the expander wheel can be conventional (i.e. EW 6) or the MSW 7 described in FIG. 7. For example, expander body 1 of the oxygenator unit represented at the top center of FIG. 14 utilizes EW 6, while expander 1*b* utilizes a series of expander wheels 8 for a conventional multiple stage steam expansion. In any case, all of these expander units can be mechanically integrated between the compressor and exhaust gas units normally available. The miniaturization of the expander body 1*a*, 1 and 1*b* allows also coupling with a convention compressor unit 2 and 2*a* so that oxygen can always be provided to the IC engine independently of IC engine RpM. For example, the oxygenator unit shown at the left bottom of FIG. 14 describes an expander unit 1*a* able to provide steam propulsion to a commercial CW 2*a*, while the shaft of the unit is truncated on one side allowing the insertion of plug 41. This particular configuration can be utilized for the applications described in FIGS. 11, 12 and 13. The oxygenator represented at the bottom center of FIG. 14 is the most optimized oxygenator unit since it utilizes symmetric geometry and completely converts vortexes and kinetic energy of the air into pressure. This unit is formed by combining body 30 and 1*a*, or body 30 and 1, or body 30 and 1*b*. In general, a symmetric geometry can be conserved even if the various expander bodies are embedded/integrated inside the cone contained inside body 30. Finally, the oxygenator shown at the bottom right of FIG. 14 is another oxygenator configured in a way that air enters through an inlet manifold 40 and can flow through a by-pass path 37*c*, and by-pass valves 38. This configuration is particularly useful when the IC engine is already equipped with a turbo-compressor, or turbo-charger, and the oxygenator only needs to provide oxygen at idling and low IC engine RpM, while the turbo-compressor already installed provides compressed air at high RpM. All of the oxygenator bodies are designed in an universal manner so as to allow for connections of additional EGW 3*b*, and casing 3, by removing plug 41 and inserting a proportionally dimensioned shaft.

Figures 15, 15A:
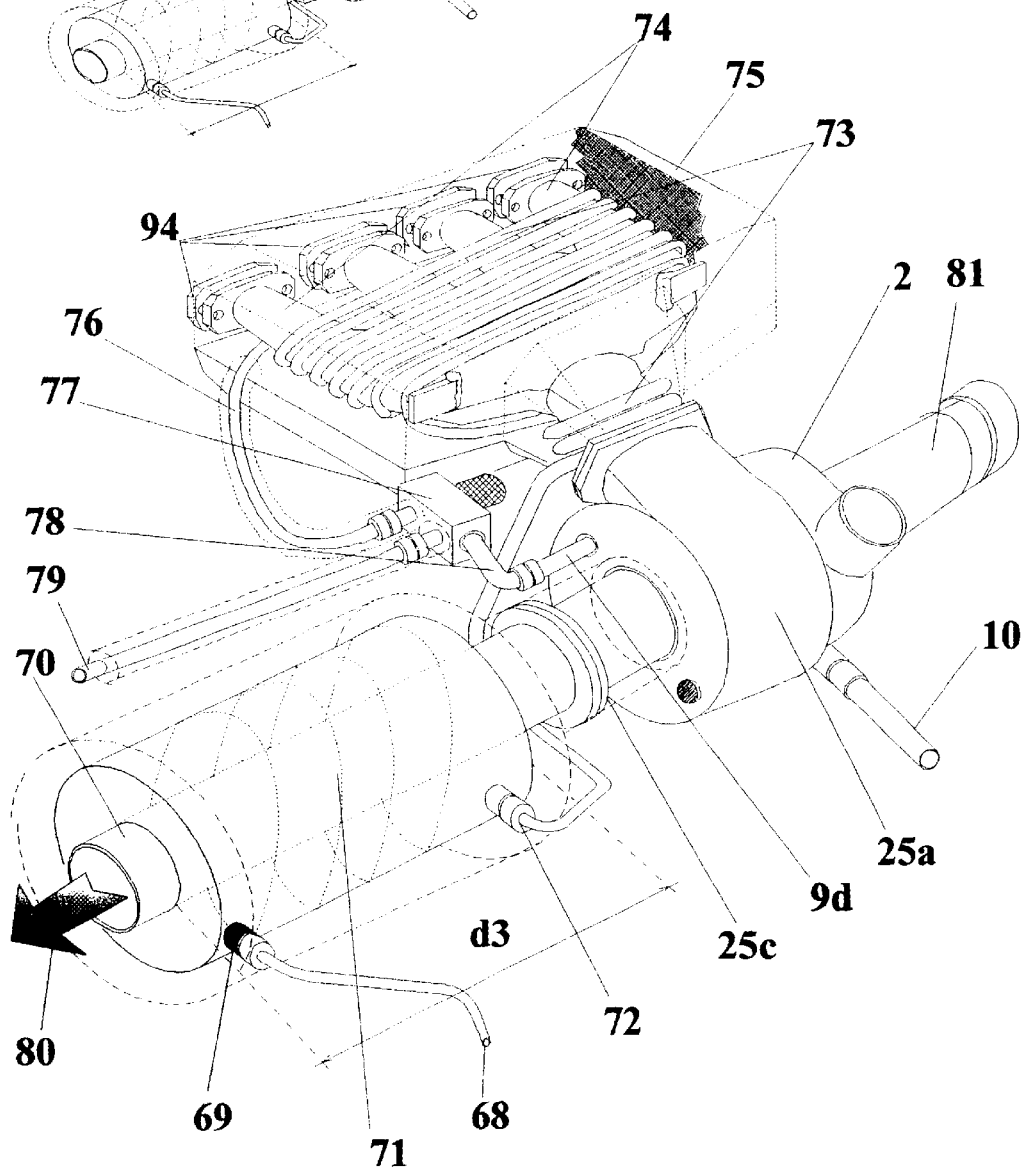
FIG. 15 shows the hydraulic circuits of the various heat converters located inside the muffler, inside or surrounding the exhaust manifold, and the jacket surrounding the EGW casing. In this Figure, the heat converter formed by a jacket in thermal contact with the hot surfaces exposed to hot exhaust gases driving the wheel, and thermally insulated from the surrounding environment, forms a hydraulic path which allows superheated vapor to flow directly into the expander (shown in detail in FIG. 5).
FIG. 15A shows a cooling system formed by heat fins/vents of the converter positioned onto or inside the exhaust manifold able to re-circulate cooling air in case of malfunctioning of the converter or the MWHE.

The heat converters of the MWHE are shown in FIGS. 15, and 15A. Liquid water (or the proper thermodynamic fluid) is injected at about 70–80° C. through a pump (pump 87 shown in FIGS. 17, and 17A). Then, high pressure fluid is injected via injector 69 connected to hydraulic path 68. This injector can essentially be a check valve, spring loaded, or electronically activated. If the pump is a positive displacement pump, injector 69 can actually be eliminated. Liquid fluid is now injected inside the heat converter formed by body 70 within which hot exhaust gases 80 flow and are vented to atmospheric pressure. The amount of energy transferred from gases 80 to the fluid inside the converter depends mainly on the fluid-converter contact surface, length d3, and mass of MWHE fluid injected. To favor a greater heat exchange between fluid and gases inside converter 70 a series of helicoidal surfaces 71 are inserted inside the converter. These surfaces prolong the fluid residence time inside the converter by extending the hydraulic path of the fluid before it exits outlet 72. The working fluid (i.e. water) expands inside the converter, accelerates by moving through the helicoidal surfaces 71, and becomes superheated vapor or superheated steam. Because of the explosive nature of the expansion of the fluid inside the converter, the relative heat transfer coefficient increases accordingly, thereby allowing a miniaturization of the converter itself Thus, superheated steam, at certain thermodynamic conditions, is now available at outlet 72 (FIG. 15). Further superheating of steam can be achieved by connecting outlet 72 to a series of superheating channels 73 in thermal contact with the exhaust gases. The maximum superheating temperature of the steam is reached inside channels 73 closer to the combustion chambers outlet (near the exhaust manifold flanges 74).

Channels 73 can be substituted by a jacket surrounding the exhaust manifold becoming another converter. To regulate the excess steam a three-way valve 77 is connected to tube 76 exiting the converter formed by channels 73. In general, valve 77 can be substituted by equivalent valves 77a, and 77b as shown in FIG. 17. In FIG. 15 the oxygenator unit is integrated with a turbo compressor as described in FIG. 5 and 6, and is thermally insulated by insulating material 25a. Valve 77 is operated to control the admission of steam inside the expander unit, and to redirect the excess steam to the AEF 11 (FIG. 10) through the hydraulic path 79. Outlet 78 of valve 77 is connected to the expander inlet ports 9d (or 9d, FIG. 5, and inlet/outlet ports 9d, FIG. 6). Superheated steam expands inside the integrated expander (1a, 1, or 1b), and condenses into a condenser through discharge hydraulic path 10, or it condenses through implosion inside the body of the expander (FIG. 3). To minimize heat loss from the exhaust manifold 74, an insulating material 75 can be utilized as shown in FIG. 15. Seals 94 between IC engine block and exhaust manifolds 74 are made of a thermally insulating material as well (conserving heat of the exhaust gases). To prevent overheating of the converter formed by channels 73 in thermal contact with the exhaust gases near the combustion chambers outlet, the thermally insulating structure 75 can be arranged in a way that movable fins 134 (FIG. 15A) opens when the MWHE is malfunctioning. Therefore, activating fins 134 in FIG. 15A provides cooling of the exhaust gas manifold structure when steam is not circulating inside the MWHE. In FIG. 15A, the thermal insulation 75 described in FIG. 15 can be formed by an air chamber relatively sealed when fins 134 are closed (when the MWHE is working properly), or thermal insulation is minimized when fins 134 are automatically or manually opened (air can circulate through the exhaust manifold). For example, opening of fins 134 can occur if the temperature of the manifold materials overcomes a pre-set safety threshold.

In FIG. 16 a higher degree of steam superheating can be achieved thanks to different hydraulic connections of the various converters. Again, liquid fluid is injected through injector 69, becomes superheated at the max temperature of converter 70, exits from outlet 72 and enters the converter formed by the jacket surrounding the EGW 3b through inlet 9d. Here another energy transfer process occurs and the superheated level is increased. Superheated vapor exits this converter from outlet 9d and enters the converter formed by channels 73. Here the level of superheat is increased even further. Now, vapor at its maximum temperature and pressure is regulated by valve 77. The excess vapor is directed toward the ABF 11 via thermally insulated tube 79, while the proper amount of superheated vapor is allowed to expand inside the expander through thermally insulated tube 78, connected to expander inlet 9e. Vapor gives up energy through the expander and condenses into a condenser via tube 10. The exhaust gases 80, generated during combustion, transfer heat to the various converters (channels 73, jacket surrounding EGW 3b, and converter 70) while also transferring their kinetic and pressure energy to EGW 3b (blanketed by insulation 25b in FIG. 16). Oxygen, on the other hand, enters the air intake manifold 81 and is compressed by CW 2a, surrounded by structure 2. CW 2 in this configuration is powered by the summation of the torque developed by the MWHE's expander (especially at low IC engine RpM), and the torque generated by the EGW 3b, once the IC engine reaches relatively high RpM. The various converters utilized in FIGS. 15 and 16 can be utilized in the applications described in FIGS. 11, 12, 13 and 14.

Finally, thermodynamic processes of the complete MWHE are described in the schematic in FIG. 17. The cooling circuit of the IC engine 43 is formed by the closed hydraulic loop composed of the water pump 82, radiator 84, and converter 83. The cooling water of IC engine 43 normally reaches 90° C., after which a thermostat valve, usually positioned at the discharge of pump 82, opens and allows a forced circulation of the coolant to the radiator 84 which transfers heat via air convection indicated by arrow 85. By inserting the heat converter 83 and 83a, most of the heat carried by the coolant can be transferred to a new closed hydraulic closed loop. Converter 83 and 83a separates the IC engine cooling circuit from the MWHE circuit for safety and reliability. However, this converter can be eliminated if the MWHE working fluid is also utilized to cool the IC engine 43. In this case, radiator 84 becomes the condenser 85 of the MWHE, thereby simplifying the overall device. If the hydraulic circuit of the MWHE is independent of that of the IC engine 43, a different fluid (i.e. with lower vapor pressure inducing higher thermodynamic efficiencies) can be utilized as the working fluid for the MWHE. The working fluid circulating inside the circuit of the MWHE is pressurized by pump 87 and receives a first heat addition process inside side 83a of the converter formed by the two separate loops 83 and 83a. This pressurized fluid is then injected through hydraulic path 68 and injector 69. Converter 88, represented in FIG. 17, can be formed by the combinations of the converters formed by bodies 70, 73, 75, 25a and 25b, and the converter formed by the jacket surrounding the EGW 3b in FIGS. 15, 16, and/or converter 103 described in FIG. 18. Back to FIG. 17, liquid fluid enters converter 88 and expands immediately. At the outlet 76, a superheated desired mass of vapor, with a certain energy content, is regulated by valves 77a and 77b (or a three-way valve 77, FIGS. 15, and 16) so that the proper amount of steam is admitted by expander 1a nd AEF 11. Expander 1, provides the propulsion system for a compressor system 2, or any of the oxygenators described in FIG. 14. AEF 11 instead utilizes the excess steam to transform it into useful energy by direct or indirect coupling with crankshaft 44. Pressure and temperature sensors are positioned inside converter 88 providing thermodynamic information via electronic signals 91 processed by a computerized unit 92, or a sub-computer system, indicated by "S" in the drawings, specialized only to optimize the operation of one of the miniaturized engine subcomponents (i.e., expander, imploder, converter). Computerized unit 92 monitors and controls the amount of steam to the various expanders through actuators/valves 89. For example, actuators 89 can be electrical motors or pneumatically actuated motors that regulate valves 77a and 77b. When the IC engine 43 is cold started, computer 92 activates pump 87 through the electric connection 90 only when the temperature of converter 83 or converter 88 reaches a pre-set level. Pump 87 could also be entirely mechanical (i.e. positive displacement) and activated through mechanical links by the IC engine 43. Again, when pump 87 is active, the fluid receives heat from converter 83a before being injected inside converter 88. Inside converter 88 pressure and temperature of the rapid forming vapor is proportional to the amount of heat transferred from exhaust gases 80. All of the expanders (i.e. 1a, 1, 1b, 11) utilized by the MWHE are controlled by computer 92 and can be operated in a pulsed or continuous manner. For example, through computer 92, valve 77band 77a can be kept partially closed causing a rapid increase of the circuit pressure. When the accelerator of IC engine 43 is pressed, valve 77b and/or 77a can be set open and a surplus of torque is temporarily available to the IC engine 43. If the IC engine 43 is a large diesel engine, the pressure inside circuit 76 can be adjusted such that boost power can be provided by AEF 11 to the engine every time the load is maximum (i.e. Truck or Bus facing steady-to-accelerating conditions). If the IC engine 43 is a performance engine, valve 77b can be operated such that overpressures are available at the engine intake manifolds allowing the injection of more fuel leading to increased overall engine power. If computer 92 is set to operate in a continuous power mode, valves 77b and 77a can be actively adjusted to provide power at all times. Probe 91 inside converter 88 provides the necessary thermodynamic parameters to computer 92 which is also able to shut-down the MWHE in case of overpressure, or any anomaly developed in the MWHE circuit. When MWHE is shut-down due to anomalies, computer 92 sets valve 97 open and discharges steam back to the condenser 86, or, if the fluid is water, into the environment. In this case, to avoid overheating of the converter formed by channels 73, FIGS. 15, and 16, fins 134, FIG. 15A are set open by computer 92 (or manually). When fluid in the MWHE flows through valve 97, or is lost due to breakage of the circuit, an optical and/or audio alarm is activated through an electrical connection 114, or via computer 92. In general, computer 92 is a control system able to monitor analog or digital inputs proportional to crankshaft 44 RpM via sensor 55, AEF 11 speed via sensor 56, EW 6 speed via sensor 115 (as described in FIGS. 3A, and 3B). These electronic signals (conditioned by a conventional Input/Output interface) are processed by computer 92 which regulates the positions of the various valves and actuators accordingly (i.e. servo motors 112, via electrical connections 113, as described in FIGS. 3A, and 3B). Computer 92 can be formed by a microprocessor structure user programmable or customizable by the insertion of specially mapped memories (i.e. pulsed or continuos mode operation of the miniaturized waste heat engine)

In FIG. 17A the hydraulic circuit of the MWHE utilizes a pressurized tank 125 as a way to accumulate excess steam rather than dissipating it through the AEF 11 utilized in FIG. 17. As described earlier, excess steam is produced because the heat produced by the engine provides more energy than that required to only power an oxygenator. However, this excess energy can be accumulated and returned to the IC engine in the form of boost pressure. By having such a high pressure availability when the IC engine is accelerating from idling RpM to high RpM, it is possible to obtain significantly increased IC engine performance since more fuel can be burned given the increased availability of oxygen. In FIG. 17A, steam drives only an oxygenator designed to provide large mass flow rates of oxygen to the IC engine regardless of its number of RpM. If converter 88 generates too much steam, the mass flow rate of fluid pumped by pump 87 can be reduced. This could cause a significant temperature increase inside the converter. The excess energy from converter 88 can be utilized to provide very large mass flow rates of air at high pressures by accumulating the excess steam inside tank 125. This configuration is particularly advantageous when the IC engine is operated in an urban cycle (continuous accelerations and decelerations). Excess steam is regulated by valve 77a connected to tank 125 through insulated piping and joint 126. Again, the pressure inside tank 125 is adjusted and controlled by computer 92. If the pressure inside tank 125 increases beyond a pre-set threshold, valve 132 is set open by computer 92 and steam condenses inside radiator 86 via piping 10. If an imploder system is dimensioned to condense the same mass of superheated vapor entering the expander (i.e. 1c and "I", in FIG. 8), then radiator 86 can be eliminated. If the IC engine idles for long periods the overall heat converted by converter 88 might not be sufficient to provide large amounts of oxygen when requested by a sudden acceleration. In fact, Expander 1 might be in a situation where the mass flow rate of steam is insufficient to provide enough propulsion for its CW 2a. In this case, computer 92 opens valve 131, discharging steam pressure previously accumulated directly through expander 1. The increased pressure inside hydraulic path 130 does not affect valve 77b since a check valve 127 prevents back overpressures inside hydraulic circuit 76. Valves 131 and 132 are controlled by actuators 128 and 129, which are driven by computer 92. Tank 125 is thermally insulated through insulating materials or through a jacket 133 in which a vacuum can be established through valve 124.

Figure 18:
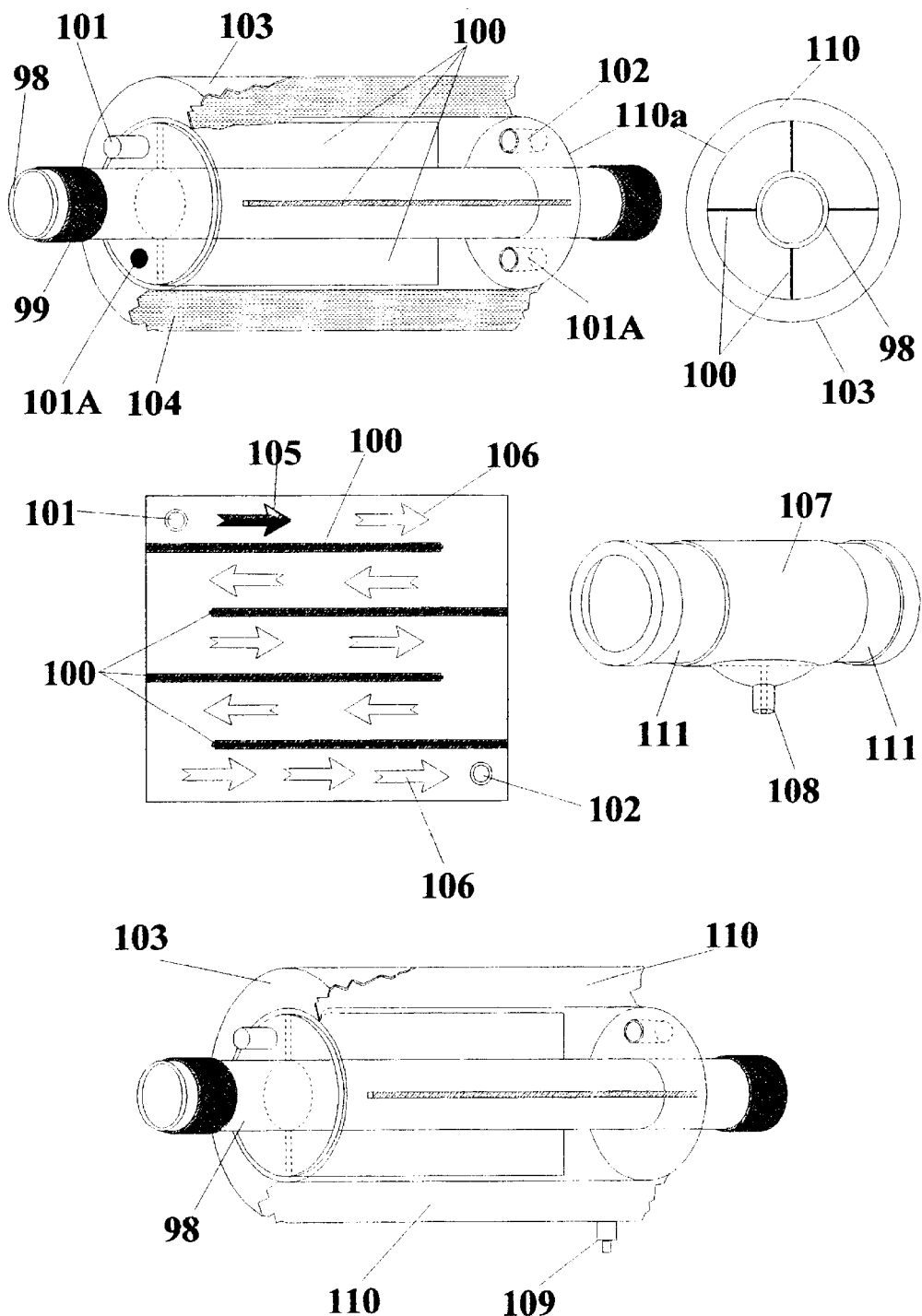
FIG. 18 represents a sectional view of a heat converter of easy construction and equipped with internal fins/paths for a better heat transfer, thermally insulted with proper materials or by means of an additional jacket in which it is possible to obtain a vacuum and good thermal insulation.

Converters with a poor heat transfer efficiency can be made by simply winding a coil in thermal contact with the IC engine exhaust manifold, and/or muffler. To obtain an optimized transfer of energy from the exhaust gases to the MWHE, a compact and simple converter capable of sustaining severe pressure fluctuations is represented in FIG. 18. Exhaust gases enter tube 98 flanged and sealed by seal 99 and allowing the connection of multiple converters in series or parallel so as to form a bank of converters. The number of converters utilized depends on the mass flow rate requirements and the amount of waste heat to be recuperated. Hydraulically sealed connections between various converters can also be achieved through universal joints 107 shaped in any geometry to accommodate the IC engine compartment available space (i.e. elbows with variable angles of inclination). The length and diameter of tube 98 combined with the number of internal fins 100 and the distance between the outer surface of tube 98 and the inner surface of tube 110a determines the amount of heat transfer capability of the converter. This heat transfer rate will also be proportional to a certain mass flow rate of the MWHE's working fluid. Fins 100 form a hydraulic path forcing the fluid to have a relatively long residence time inside the converter. Furthermore, this path forces the fluid to have intimate contact with the inner surfaces of the converter, favoring an extremely rapid heat transfer. Water can be injected inside the converter through one of the inlet/outlet 101, 101a or 102. The converter is symmetric and inlets and outlets can be exchanged. Generally, to improve the converter efficiency, the MWHE fluid inlet port should be chosen at the end of the exhaust gas hydraulic circuit (as far as possible from the combustion chambers). Arrow 105 represents liquid water, relatively cold, injected from inlet 101 inside a converter (here represented open). As soon as water is injected it expands, changing its specific volume by a factor of several thousands. This thermodynamic expansion provokes extremely rapid steam/water accelerations inside the chamber formed by the outer surface of tube 98 and the inner surface of tube 110a concentric with tube 98. Heat is added to the water, which becomes steam 106. While steam travels inside the path formed by fins 100, its pressure and temperature rapidly increase, making it superheated before it exits outlet 102. The number of fins 100 is variable and the inlet/outlet ports can be welded or threaded on the end cups sealing the jacket formed by tube 98 and 110a. Inlet ports 101a provide a sealed penetration for temperature or pressure sensors. If these ports are not utilized they can be simply plugged. To minimize heat losses from the converter to the surrounding environment, the converter can be thermally insulated by wrapping it with insulating material 104. To further improve thermal insulation, a vacuum chamber 110 is formed by inserting another concentric cylinder surrounding tube 110a (sealed with the end cups). Air can be evacuated during manufacturing or through valve 109. If the heat transfer between exhaust gases and the fluid of the MWHE is optimum, the temperature of the exhaust gases might drop so severely that water produced during the combustion of fuel would start condensing toward the end of the last converter 98 of a bank of converters. By utilizing valve 108 inserted in one of the coupling joints 107 positioned in the lower point of the converter bank (or even if it is a single converter), condensed water in the exhaust gases can discharge without accumulating inside tube 98, minimizing corrosion. If the IC engine is equipped with a catalytic converter, the converters of the MWHE have to be inserted after the catalytic converter, or computer 92 has to be programmed to produce steam in quantities that do not lower the exhaust gases temperature to levels that would damage or impair the correct functioning of the catalytic converter.

What is claimed is:

1. A miniaturized waste heat engine configured to recuperate waste energy from a heat source and convert said waste energy into useable energy, said engine comprising:
   at least one heat source,
   at least one thermal seal which separates cooled parts of said heat source from the hottest parts of said heat source,
   at least one liquid-to-liquid heat converter separating a cooling fluid of said cooled parts of said heat source from a low vapor pressure fluid of said miniaturized waste heat engine,
   at least one miniaturized heat converter using said heat source to evaporate a liquid into vapor,
   at least one expander converting said vapor into said useable energy,
   at least one oxygenator coupled to said expander including an air compressing wheel
   a first set of valves regulating the amount of said vapor into said expander,
   a second set of valves regulating the amount of said vapor into said expander, and into an imploding chamber, and into a radiator,
   at least one pump pressurizing said liquid,
   at least one fluid injector,
   at least one sub-controller system interfaced with at least a computerized control system regulating the opening and closing of both said sets of valves,
   at least one said imploding chamber condensing said vapor exiting said expander,
   at least one said radiator condensing said vapor exiting said expander,
   at least one pressure relief safety valve; and
   at least one thermally insulating vacuum jacket surrounding the body of a centrifugal gas nozzle.

2. A miniaturized waste heat engine as defined in claim 1, further comprising at least one auxiliary flywheel expander to convert excess vapor into said useable energy, wherein the amount of vapor into said auxiliary flywheel expander is controlled by said first set of valves.

3. A miniaturized waste heat engine as defined in claim 2, wherein said auxiliary flywheel expander operates in pulsed mode.

4. A miniaturized waste heat engine as defined in claim 2, wherein said auxiliary flywheel expander operates in continuous mode.

5. A miniaturized waste heat engine as defined in claim 2, further comprising at least one pressurized tank to accumulate and release said excess vapor to said expander and to said auxiliary flywheel expander.

6. A miniaturized waste heat engine as defined in claim 1, wherein said low vapor pressure fluid is pumped inside said miniaturized heat converter by at least one pump.

7. A miniaturized waste heat engine as defined in claim 1, wherein said miniaturized heat converter further comprises:
   a plurality of superheating channels,
   a plurality of heat converters hydraulically connected to one another,
   an insulating air chamber surrounding said superheating channels,
   multiple movable fins surrounding said insulating air chamber, and
   multiple thermally insulating vacuum jackets surrounding said miniaturized heat converter.

8. A miniaturized waste heat engine as defined in claim 7, wherein inside said miniaturized heat converter said vapor flows from at least one inlet, hydraulically connected through thermally insulating tubes, to at least one outlet where said vapor flows from said outlet to at least one inlet of said expander.

9. A miniaturized waste heat engine as defined in claim 8, wherein inside said miniaturized heat converter said vapor flows from at least one outlet, hydraulically connected through thermally insulating tubes, to at least one inlet of said auxiliary flywheel expander.

10. A miniaturized waste heat engine as defined in claim 7, wherein the surfaces of the body of the centrifugal gas nozzle in combination with the inner surfaces of the casing surrounding said body of the centrifugal gas nozzle forms a heat chamber.

11. A miniaturized waste heat engine as defined in claim 10, wherein said heat chamber is thermally insulated through insulating means.

12. A miniaturized waste heat engine as defined in claim 11, wherein said insulating means are formed by vacuum jackets whose vacuum can be controlled by at least one vacuum valve.

13. A miniaturized waste heat engine as defined in claim 11, wherein said insulating means are formed by insulating materials.

14. A miniaturized waste heat engine as defined in claim 7, wherein said miniaturized heat converter comprises at least one pressure and at least one temperature sensors connected to said sub-controller system interfaced with said computerized system, actuating and regulating said plurality of valves through actuators.

15. A miniaturized waste heat engine as defined in claim 1, wherein said expander comprises at least one nozzle, at least one needle, and mechanical means regulating the position of said needle within said nozzle.

16. A miniaturized waste heat engine as defined in claim 15, wherein said expander comprises:
   at least one inlet and at least one outlet;
   at least one imploding chamber for contraction and condensation of said vapor into said liquid;
   at least one expander wheel located inside said expander and connected to a drive shaft;
   said drive shaft being pressure sealed and mutually connected with an air compressor wheel and an exhaust gas wheel.

17. A miniaturized waste heat engine as defined in claim 16, wherein said drive shaft is supported by at least one self-lubricating thrust bearing and at least one self-lubricating bearing.

18. A miniaturized waste heat engine as defined in claim 17, wherein said expander further comprises a lubricating oil tank, an oil sump tank, and connecting hydraulic paths providing lubrication to said thrust bearing and said bearing.

19. A miniaturized waste heat engine as defined in claim 17, wherein said needles can be actuated through actuators.

20. A miniaturized waste heat engine as defined in claim 19, wherein said actuators include movement sensors.

21. A miniaturized waste heat engine as defined in claim 19, wherein said actuators are driven by electrical motors.

22. A miniaturized waste heat engine as defined in claim 19, wherein said actuators are driven by pneumatics.

23. A miniaturized waste heat engine as defined in claim 16, wherein portions of the casing of said expander comprise insulating materials separating the casing from said air compressor wheel.

24. A miniaturized waste heat engine as defined in claim 16, wherein said imploding chamber is formed by fins whose extended heat transfer surfaces are hydraulically connected to a tank or said radiator wherein said contracted and condensed vapor accumulates.

25. A miniaturized waste heat engine as defined in claim 16, wherein said imploding chamber is formed by the surfaces of a fixed cone thermally connected to vanes.

26. A miniaturized waste heat engine as defined in claim 16, wherein inside said expander at least one pressure and at least one temperature sensors interfaced with said subcontroller systems allow said computerized control system to actively control the speed of said expander wheel by changing the position of said needle within said nozzle.

27. A miniaturized waste heat engine as defined in claim 16, wherein said drive shaft comprises one or a plurality of blades forming at least one or a plurality of channels shaped to impart kinetic energy to a lubricating fluid as a result of the rotation of said drive shaft.

28. A miniaturized waste heat engine as defined in claim 16, further comprising a self pumping and lubricating mechanism wherein said drive shaft is at least partially hollow, said partially hollow drive shaft forming an internal hydraulic channel connecting said blades within which said lubricating fluid flows through at least one inlet hole into said hydraulic channel to at least one outlet hole into another set of blades located along said partially hollow drive shaft.

29. A miniaturized waste heat engine as defined in claim 16, wherein the mutual combination of said nozzles, disposed substantially parallel to said drive shaft, and the shape of the blades of said expander wheel results in a net vapor force zeroing all other axial forces acting upon said drive shaft.

30. A miniaturized waste heat engine as defined in claim 16, wherein the mutual combination of said nozzles, disposed substantially perpendicular to said drive shaft, and the shape of the blades of said expander wheel results in a net axial vapor force zeroing all other axial forces acting upon said drive shaft.

31. A miniaturized waste heat engine as defined in claim 16, wherein said drive shaft is mechanically connected to adjustable balancing masses.

32. A miniaturized waste heat engine as defined in claim 16, wherein said expander is plugged on one side by a thermally insulating plug and mechanically connected to an air compressor wheel rotated 180° with respect to said drive shaft.

33. A miniaturized waste heat engine as defined in claim 16, wherein said auxiliary flywheel expander comprises a clutch activated in a continuous manner through said computerized system and is mechanically connected to an engine crankshaft by means of a modified pulley connected to a coupling flange.

34. A miniaturized waste heat engine as defined in claim 16, wherein said auxiliary flywheel expander comprises a clutch that can be activated in a pulsed manner through said computerized system and is mechanically connected to a engine crankshaft by means of a modified pulley connected to a coupling flange.

35. A miniaturized waste heat engine as defined in claim 16, wherein said expander comprises at least one multiple stage wheel in which different sets of blades are formed inside said multiple stage wheel, wherein said multiple stage wheel is driven by said vapor expansion through a plurality of nozzles having different inlet and outlet diameters and positioned substantially parallel to said drive shaft.

36. A miniaturized waste heat engine as defined in claim 35, wherein said plurality of nozzles are connected by an hydraulic path capable of inverting the direction of said vapor to conserve the direction of motion of said multiple stage wheel.

37. A miniaturized waste heat engine as defined in claim 35, wherein said vapor flows from said heat chamber through at least one inlet into the first set of said plurality of nozzles.

38. A miniaturized waste heat engine as defined in claim 1, comprising a vacuum valve for evacuation of air between said jacket and an additional jacket surrounding said jacket and forming said heat chamber.

39. A miniaturized waste heat engine as defined in claim 1, comprises a fluid cooling tank in thermal contact with the air circulating through said compressor wheel.

40. A miniaturized waste heat engine as defined in claim 1, wherein said oxygenator is formed by coupling said expander body with two concentric cones forming an axial diverging nozzle along the flow path of the air entering said oxygenator from at least one intake manifold and exiting from said oxygenator from at least one outlet.

41. A miniaturized waste heat engine as defined in claim 40, comprising one fixed cone mechanically connected to fixed vanes mechanically connected to a surrounding cone-like or cylindrical-like structure mechanically connected to a semi-toroid body flanged through a coupling flange with said expander body.

42. A miniaturized waste heat engine as defined in claim 41, wherein said oxygenator comprises an internal flow path forming a curved diverging nozzle such that said air enters said structure axially through said air compressor wheel and exits said diverging nozzle axially.

43. A miniaturized waste heat engine as defined in claim 42, wherein said fixed cone of said oxygenator comprises said expander body forming a self contained oxygenator-expander unit.

44. A miniaturized waste heat engine as defined in claim 42, wherein said fixed vanes of said oxygenator are curved in the direction of the air flow redirecting the final direction of said air flow from a mainly centrifugal motion to an axial motion.

45. A miniaturized waste heat engine as defined in claim 42, wherein said fixed vanes of said oxygenator include thermally insulated flow paths for said vapor to enter said self contained oxygenator-expander unit, and thermally conductive cooling flow paths forming al least one imploding chamber.

46. A miniaturized waste heat engine as defined in claim 45, wherein said thermally conductive cooling flow paths of said oxygenator form a plurality of imploding chambers.

47. A miniaturized waste heat engine as defined in claim 41, wherein said cone-like or cylindrical-like structure of said oxygenator contains flow by-pass valves formed by flexible materials allowing an automatic flow by-pass when the pressure at said oxygenator outlet is lower than the pressure at said inlet air path.

48. A miniaturized waste heat engine as defined in claim 47, wherein said by-pass valves are connected to a manifold hydraulically connecting said inlet air path to said oxygenator outlet.

49. A miniaturized waste heat engine as defined in claim 41, wherein said cone-like or cylindrical-like structure of said oxygenator is hydraulically connected upstream to an engine air filter whose outlet is connected in series with a conventional turbo compressor.

50. A miniaturized waste heat engine as defined in claim 41, wherein said cone-like or cylindrical-like structure of said oxygenator is hydraulically connected to the engine air intake manifold downstream of the engine air filter and in series with a conventional turbo compressor.

51. A miniaturized waste heat engine as defined in claim 41, wherein said cone-like or cylindrical-like structure of said oxygenator is hydraulically connected through a jet nozzle to the engine intake manifold in series with a conventional turbo charger.

52. A miniaturized waste heat engine as defined in claim 1, wherein said drive shaft passes through an axial diffuser.

53. A miniaturized waste heat engine as defined in claim 52, wherein said axial diffuser comprises static vanes extending from said axial diffuser to said oxygenator intake path.

54. A miniaturized waste heat engine as defined in claim 1, wherein said auxiliary expander flywheel is encased inside a body of a power unit directly connecting said engine crankshaft via clutch mechanically connected with speed adjusting gears.

55. A miniaturized waste heat engine as defined in claim 54, wherein said auxiliary expander flywheel of said power unit, comprises at least one inlet for vapor admission, at least one imploding chamber containing cooled surfaces to generate vapor contraction, at least one outlet.

56. A miniaturized waste heat engine as defined in claim 54, wherein an auxiliary flywheel expander of said power unit, comprises speed sensors connected to a sub-controller system interfaced with said computerized control system.

57. A miniaturized waste heat engine as defined in claim 1, wherein said expander body is mechanically coupled to a centrifugal exhaust gas nozzle wherein multiple vapor inlets provide a flow path for said vapor to enter as well as to exit said heat chamber independently of the inlets positioned on said expander body.

58. A miniaturized heat converter as defined in claim 1, formed by an internal hydraulic path within which said fluid expands to vapor and gains heat energy comprising:

at least one fluid injector, a plurality of helicoidal surfaces or a plurality of extended surfaces, at least one inlet and at least one outlet interchangeable, at least one thermally insulating jacket surrounding the inner surface of said heat converter, connecting and sealing tubes for hydraulic connections with a plurality of said heat converters, at least one liquid purging valve, an inner surface exposed on one side to said heat source and to said low vapor pressure fluid on the other, an intermediate chamber within which said low vapor fluid expands forming vapor, at least one vacuum valve connected to a vacuum chamber surrounding said inner surface.

59. A method of recovering waste energy from a heat source and converting said waste energy into useable energy by using a miniaturized waste heat engine, said heat engine comprising at least one miniaturized heat converter, at least one expander, at least one oxygenator, a plurality of valves regulating fluid flows within said heat converter, at least one fluid injector, and at least one sub-computer system controlling the fluid flow within said heat engine, comprises the steps of:

pressurizing a liquid, injecting said liquid through said fluid injector into said miniaturized heat converter, evaporating said liquid in a plurality of superheating channels hydraulically connected to said expander, contracting and condensing said vapor in a imploding chamber of said expander, converting said vapor into useable energy in said expander, regulating fluid flows within said heat engine by said plurality of valves through a sub-controller system interfaced with a computerized control system, condensing said vapor exiting said expander into said imploding chamber and in a radiator, and thermally insulating said heat converter of said heat engine with vacuum jackets.

\* \* \* \* \*